United States Patent
Lee et al.

(10) Patent No.: US 11,637,920 B2
(45) Date of Patent: Apr. 25, 2023

(54) PROVIDING SITUATIONAL DEVICE SETTINGS FOR CONSUMER ELECTRONICS AND DISCOVERING USER-PREFERRED DEVICE SETTINGS FOR CONSUMER ELECTRONICS

(71) Applicant: Samsung Electronics Co., Ltd., Suwon-si (KR)

(72) Inventors: Ho Sub Lee, Irvine, CA (US); Young Min Park, Irvine, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 17/126,558

(22) Filed: Dec. 18, 2020

(65) Prior Publication Data

US 2022/0030102 A1    Jan. 27, 2022

Related U.S. Application Data

(60) Provisional application No. 63/056,998, filed on Jul. 27, 2020, provisional application No. 63/056,870, filed on Jul. 27, 2020.

(51) Int. Cl.
*H04M 1/00* (2006.01)
*H04M 1/72448* (2021.01)
*G06K 9/62* (2022.01)

(52) U.S. Cl.
CPC ...... *H04M 1/72448* (2021.01); *G06K 9/6223* (2013.01); *G06K 9/6256* (2013.01)

(58) Field of Classification Search
CPC ............ H04M 1/72448; G06K 9/6223; G06K 9/6256
See application file for complete search history.

(56) References Cited

U.S. PATENT DOCUMENTS 8,786,585 B2    7/2014 Longhurst et al.
8,847,972 B2    9/2014 Kane et al.
(Continued)

FOREIGN PATENT DOCUMENTS

JP         2014027642       2/2014
JP          6559040 B2      8/2019
KR   10-2014-0050464 A      4/2014

OTHER PUBLICATIONS

International Search Report & Written Opinion dated Nov. 16, 2021 for International Application PCT/KR2021/009699 from Korean Intellectual Property Office, pp. 1-8, Republic of Korea.

*Primary Examiner* — Khai M Nguyen
(74) *Attorney, Agent, or Firm* — Sherman IP LLP; Kenneth L. Sherman; Hemavathy Perumal

(57) ABSTRACT

One embodiment provides a method comprising receiving device setting behavioral data collected from one or more consumer electronic (CE) devices, and generating one or more machine learning (ML) models based on a portion of the device setting behavioral data. In one embodiment, the method comprises predicting, via the one or more ML models, a device setting suitable for a CE device based on a current user context, and providing a recommendation comprising the predicted device setting to the CE device. In another embodiment, the method comprises clustering, via the one or more ML models, at least one user associated with the one or more user-initiated adjustments into at least one user group, and determining one or more user-preferred device settings that the user group prefers most. The one or more user-preferred device settings are provided to a CE device as one or more new device settings available for user selection.

27 Claims, 12 Drawing Sheets

(56) References Cited

U.S. PATENT DOCUMENTS

| | | |
|---|---|---|
| 9,824,650 B2 | 11/2017 | Zhang et al. |
| 10,565,955 B2 | 2/2020 | Wang et al. |
| 2012/0260113 A1* | 10/2012 | Song .................. H04L 12/2829 713/320 |
| 2016/0182815 A1* | 6/2016 | Urabe .................. H04N 9/8205 348/231.6 |
| 2017/0264937 A1 | 9/2017 | Jeong et al. |
| 2018/0108294 A1 | 4/2018 | Kwon et al. |
| 2020/0013371 A1* | 1/2020 | Yang ........................ G09G 5/00 |
| 2020/0143770 A1 | 5/2020 | Tai et al. |

\* cited by examiner

PROVIDING SITUATIONAL DEVICE SETTINGS FOR CONSUMER ELECTRONICS AND DISCOVERING USER-PREFERRED DEVICE SETTINGS FOR CONSUMER ELECTRONICS

CROSS-REFERENCE TO RELATED APPLICATIONS

The present application claims priority to U.S. Provisional Patent Application No. 63/056,998, filed on Jul. 27, 2020, and U.S. Provisional Patent Application No. 63/056,870, filed on Jul. 27, 2020, both incorporated by reference in its entirety.

TECHNICAL FIELD

One or more embodiments generally relate to device settings for consumer electronics, in particular, a method and system for providing situational device settings for consumer electronics, and a method and system for discovering user-preferred device settings for consumer electronics.

BACKGROUND

Consumer electronic devices (e.g., smart television, smartphone, etc.) are now equipped with state-of-the-art display screens (e.g., QLED, OLED) that provide ultra-high picture quality.

SUMMARY

One embodiment provides a method comprising receiving device setting behavioral data collected from one or more consumer electronic (CE) devices. The device setting behavioral data is indicative of one or more user-initiated adjustments to one or more device settings of the one or more CE devices. The device setting behavioral data is further indicative of one or more user contexts in which the one or more user-initiated adjustments occurred. The method further comprises generating one or more machine learning models based on training data that includes a portion of the device setting behavioral data, and predicting, via the one or more machine learning models, a device setting suitable for a CE device based on a current user context. The method further comprises providing a recommendation comprising the predicted device setting to the CE device.

One embodiment provides a method comprising receiving device setting behavioral data collected from one or more consumer electronic (CE) devices. The device setting behavioral data is indicative of one or more user-initiated adjustments to one or more device settings of the one or more CE devices. The device setting behavioral data is further indicative of one or more device properties of the one or more CE devices. The method further comprises generating one or more machine learning models based on a portion of the device setting behavioral data, and clustering, via the one or more machine learning models, at least one user associated with the one or more user-initiated adjustments into at least one user group. The method further comprises, for each user group, determining one or more user-preferred device settings that the user group prefers most. The one or more user-preferred device settings are provided to a CE device as one or more new device settings available for user selection.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
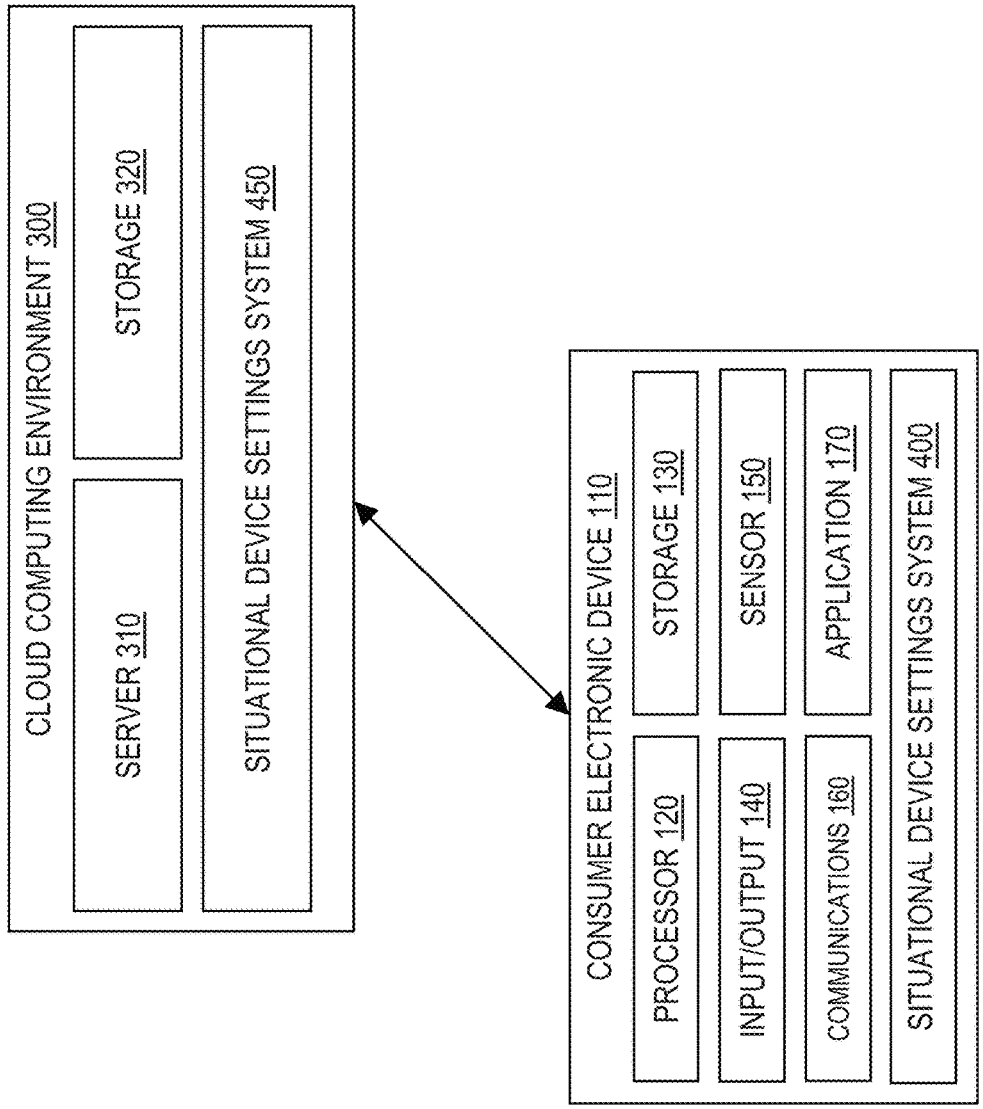
FIG. 1 illustrates an example computing architecture for implementing providing situational device settings for a consumer electronic device, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to device settings for consumer electronics, in particular, a method and system for providing situational device settings for consumer electronics, and a method and system for discovering user-preferred device settings for consumer electronics. One embodiment provides a method comprising receiving device setting behavioral data collected from one or more consumer electronic (CE) devices. The device setting behavioral data is indicative of one or more user-initiated adjustments to one or more device settings of the one or more CE devices. The device setting behavioral data is further indicative of one or more user contexts in which the one or more user-initiated adjustments occurred. The method further comprises generating one or more machine learning models based on training data that includes a portion of the device setting behavioral data, and predicting, via the one or more machine learning models, a device setting suitable for a CE device based on a current user context. The method further comprises providing a recommendation comprising the predicted device setting to the CE device.

One embodiment provides a method comprising receiving device setting behavioral data collected from one or more CE devices. The device setting behavioral data is indicative of one or more user-initiated adjustments to one or more device settings of the one or more CE devices. The device setting behavioral data is further indicative of one or more device properties of the one or more CE devices. The method further comprises generating one or more machine learning models based on a portion of the device setting behavioral data, and clustering, via the one or more machine learning models, at least one user associated with the one or more user-initiated adjustments into at least one user group. The method further comprises, for each user group, determining one or more user-preferred device settings that the user group prefers most. The one or more user-preferred device settings are provided to a CE device as one or more new device settings available for user selection.

Conventional consumer electronic devices provide users with means of customizing picture quality (i.e., picture setting options) based on their user situation. A user can adjust picture settings from default values set by a manufacturer. For example, a user can decrease the brightness level of a smart television from a default value, and can change picture mode of the smart television from Standard to Movie when the user watches cinematic content in a dark room. Many users, however, do not change picture settings due to limited knowledge and experience regarding picture quality.

Embodiments of this invention enable users to have optimal picture settings based on their user situation and circumstances, and also inform users of user-preferred picture settings, thereby allowing the users to experience the best possible picture quality that their consumer electronic devices can provide.

FIG. 1 illustrates an example computing architecture 100 for implementing providing situational device settings for a consumer electronic device 110, in one or more embodiments. The computing architecture 100 comprises a consumer electronic device 110 including resources, such as one or more processor units 120 and one or more storage units 130. One or more applications may execute/operate on the consumer electronic device 110 utilizing the resources of the consumer electronic device 110.

In one embodiment, the one or more applications on the consumer electronic device 110 include a first situational device settings system 400 configured to adjust (i.e., change) one or more device settings of the consumer electronic device 110 based on a current situation of a user utilizing the consumer electronic device 110. There are different types of device settings such as, but not limited to, picture settings, audio settings, etc. As described in detail later herein, in one embodiment, the first situational device settings system 400 is configured to collect device setting behavioral data, and transmit the device setting behavioral data to a second situational device settings system 450 deployed at a cloud computing environment 300.

In one embodiment, the device setting behavioral data comprises: (1) picture setting behavior information representing user-initiated adjustments to picture settings items of the consumer electronic device 110, wherein the adjustments represent behaviors (i.e., patterns) of the user in relation to picture setting ("picture setting behaviors"), and (2) situational information representing situations (i.e., contexts) of the user in which the adjustments occurred.

In one embodiment, a portion of the device setting behavioral data is used by the second situational device settings system 450 to train one or more machine learning models 480 (FIG. 2) to learn device setting behaviors, such as picture setting behaviors. After training, each resulting trained machine learning model 480 is deployed at the cloud computing environment 300 to predict (i.e., recommend) a device setting based on given situational information. For example, if the predicted device setting is a predicted picture setting, the predicted device setting includes a predicted (i.e., recommended) value for a picture setting item. Each resulting trained machine learning model 480 may be specific to a particular geographic region/country that the user is located in, a specific device model number of the consumer electronic device 110, or a specific user group that the user belongs to (e.g., a user group based on demographics such as race, sex, age, etc.).

In one embodiment, the first situational device settings system 400 is configured to: (1) transmit current situational information representing a current situation of the user to a trained machine learning model 480, (2) receive, as input, a predicted device setting from the trained machine learning model 480, and (3) adjust a device setting of the consumer electronic device 100 based on the predicted device setting. For example, if the predicted device setting is a predicted picture setting, the first situational device settings system 400 optimizes picture quality of the consumer electronic device 110 in accordance with the predicted picture setting.

Examples of a consumer electronic device 110 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), a set-top box, an Internet of things (IoT) device, an audio device (e.g., an audio speaker), etc.

In one embodiment, the consumer electronic device 110 comprises one or more hardware and/or sensor units 150 integrated in or coupled to the consumer electronic device 110, such as a camera, a microphone, a GPS, a motion sensor, etc.

In one embodiment, the consumer electronic device 110 comprises one or more input/output (I/O) units 140 integrated in or coupled to the consumer electronic device 110. In one embodiment, the one or more I/O units 140 include, but are not limited to, a physical user interface (PUI) and/or a GUI, such as a keyboard, a keypad, a touch interface, a touch screen, a knob, a button, a display screen, etc. In one embodiment, a user can utilize at least one I/O unit 140 to configure one or more user preferences, configure one or more parameters and/or thresholds, provide user responses, etc. In one embodiment, the first situational device settings system 400 is configured to optimize picture quality of the display screen in accordance with a picture setting predicted (i.e., recommended) by a trained machine learning model 480.

In one embodiment, the one or more applications on the consumer electronic device 110 may further include one or more software mobile applications 170 loaded onto or downloaded to the consumer electronic device 110, such as a camera application, a social media application, a video streaming application, etc. A software mobile application 170 on the consumer electronic device 110 may exchange data with the system 400.

In one embodiment, the consumer electronic device 110 comprises a communications unit 160 configured to exchange data with the cloud computing environment 300 over a communications network/connection (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the consumer electronic device 110 and other devices connected to the same communications network. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

Figure 2:
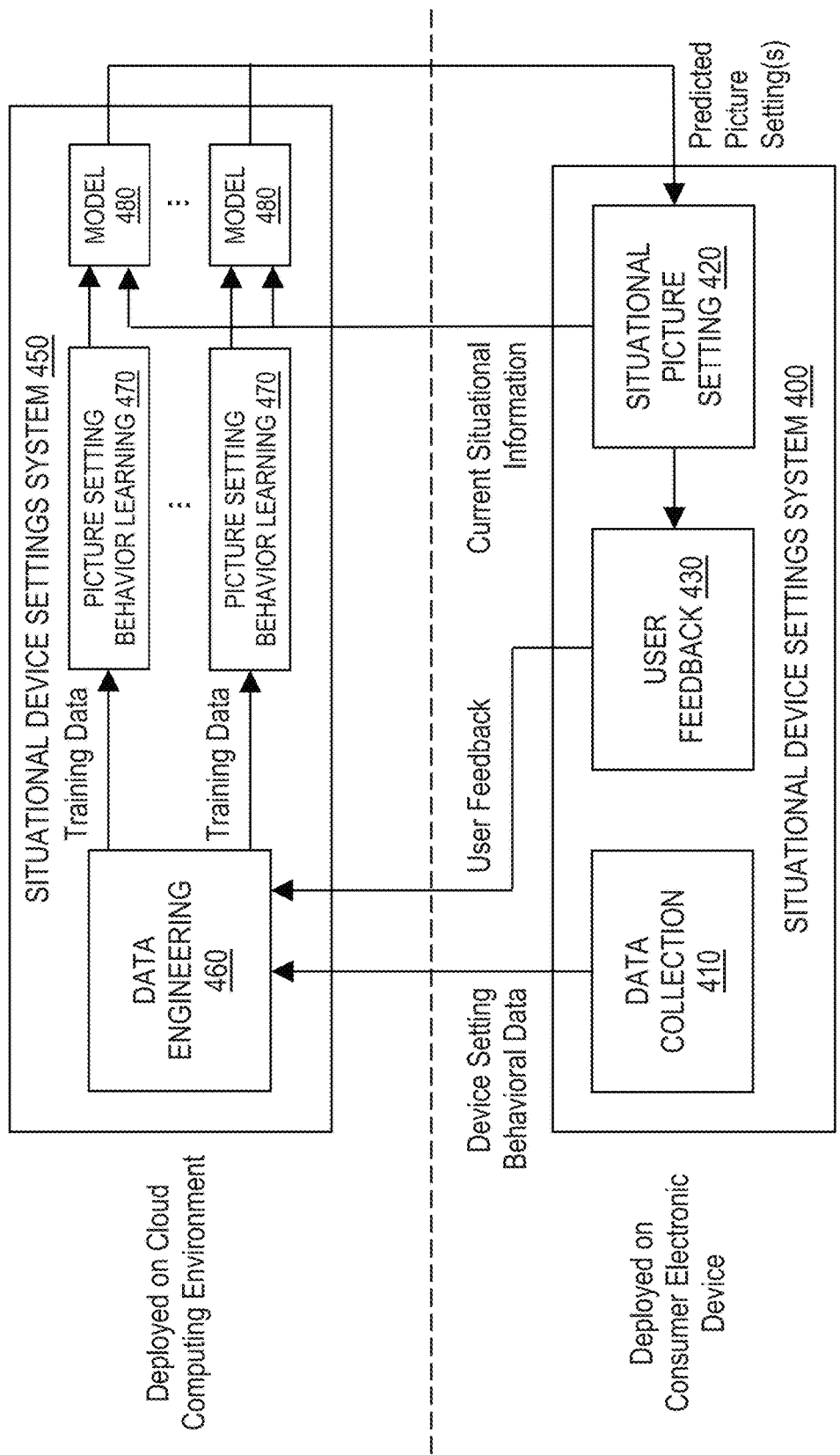
FIG. 2 illustrates an example workflow for implementing providing situational device settings for a consumer electronic device, in one or more embodiments.

In one embodiment, the cloud computing environment 300 provides a shared pool of configurable computing system resources including servers 310 and storage units 320. The cloud computing environment 300 further provides higher-level services including the second situational device settings system 450 (FIG. 2). As described in detail later herein, the second situational device settings system 450 is configured to generate training data based on device setting behavioral data collected from multiple consumer electronic devices 110, wherein the training data is used to train a machine learning model 480.

FIG. 2 illustrates an example workflow for implementing providing situational device settings for a consumer electronic device 110, in one or more embodiments. In one embodiment, the first situational device settings system 400 comprises a data collection unit 410 deployed at the consumer electronic device 110. In one embodiment, the data collection unit 410 is configured to collect different types of data, wherein the different types of data comprise: (1) picture setting behavior information representing one or more behaviors (i.e., patterns) of one or more users in relation to adjusting one or more user-configurable picture setting items of the consumer electronic device 110 ("picture setting behaviors"), and (2) situational information representing one or more situations of the one or more users (i.e., context or user situation) in which the one or more behaviors occurred (i.e., captured or observed).

In one embodiment, the data collection unit 410 is configured to determine one or more picture setting behaviors of one or more users by: (1) detecting/recognizing one or more user-initiated adjustments (i.e., changes) to one or more user-configurable picture setting items (e.g., Picture Mode, Backlight, Contrast, Brightness, Sharpness, etc.) of the consumer electronic device 110 based on collected data, wherein each user-initiated adjustment represents a picture setting behavior, and (2) for each user-initiated adjustment, detect/recognize corresponding situational information (e.g., device model number, time, location, current app, content genre, etc.) captured via one or more software and/or hardware sensors (e.g., sensor units 150) during the adjustment.

In one embodiment, the data collection unit 410 determines, across different users, diverse situational information for user-initiated adjustments to picture setting items.

In one embodiment, the data collection unit 410 is configured to: (1) generate device setting behavioral data by integrating user-initiated adjustments representing picture setting behaviors with corresponding situational information into a structured data format (e.g., a table), and (2) transmit the device setting behavioral data to another component. As described in detail later herein, in one embodiment, the data collection unit 410 transmits device setting behavioral data to an external component, such as a data engineering unit 460 deployed at a cloud computing environment 300.

Table 1 below provides an example of different user-configurable picture setting items, in one embodiment.

TABLE 1

| Picture Setting Item | Value Range |
|---|---|
| Picture Mode | [Standard\|Dynamic\|Natural\|Movie] |
| Backlight | [0, . . . , 50] |
| Contrast | [0, . . . , 50] |
| Brightness | [−5, . . . , 5] |
| Sharpness | [0, . . . , 20] |
| Color | [0, . . . , 50] |
| Tint | [0, . . . , 30] |
| Auto Motion Plus | [Standard\|Custom\|Off] |
| Blur | [0, . . . , 10] |
| Judder | [0, . . . , 10] |
| LED Clear Motion | [Off\|On] |
| Smart LED | [Standard\|High\|Low] |
| Dynamic Contrast | [High\|Low\|Off] |
| Color Tone | [Standard\|Cool\|Warm1\|Warm2] |
| [R\|G\|B] Value for White Balance 2p Offset | [−50, . . . , 50] |
| [R\|G\|B] Value for White Balance 2p Gain | [−50, . . . , 50] |
| White Balance 10p | [Off\|On] |
| White Balance Interval | [1, . . . , 20] |
| [R\|G\|B] Value for White Balance 10p | [−50, . . . , 50] |
| Gamma Config | [BT1886\|ST2084] |
| Gamma Value | [−3, . . . , 3] |

As shown in Table 1, each picture setting item has either a numerical value (e.g., picture setting items Brightness and Contrast have numerical values) or a categorical value (e.g., picture setting items Picture Mode and Color Tone have categorical values).

In one embodiment, the system 450 comprises a data engineering unit 460 deployed at a cloud computing environment 300. In one embodiment, the data engineering unit 460 is configured to: (1) receive, as input, a plurality of device setting behavioral data from a plurality of consumer electronic devices 110 (e.g., collected via data collection units 410 deployed at the consumer electronic devices 110), (2) aggregate the plurality of device setting behavioral data, (3) pre-process the resulting aggregated data, and (4) generate training data for training one or more machine learning models 480 based on the resulting pre-processed aggregated data, wherein the one or more machine learning models 480 are trained to learn one or more picture setting behaviors.

In one embodiment, the resulting aggregated data comprises: (1) one or more user-initiated adjustments to one or more picture setting items, and (2) for each user-initiated adjustment, a corresponding device identifier (e.g., Device ID) identifying a particular consumer electronic device 110 that the adjustment was collected from (i.e., the adjustment is associated/tagged with the device identifier).

In one embodiment, after the data engineering unit 460 aggregates a pre-determined amount of device setting behavioral data, the data engineering unit 460 pre-processes the resulting aggregated data to validate the aggregated data as a basis for training a machine learning model 480 to learn one or more picture setting behaviors.

In one embodiment, pre-processing aggregated data comprises the data engineering unit 460 determining if each user-initiated adjustment included in the aggregated data is valid. For example, in one embodiment, each picture setting item has a corresponding value range (e.g., see Table 1). If a value for a picture setting item is adjusted to a new value that is out of range (i.e., not within a corresponding value range for the picture setting item), the data engineering unit 460 determines this particular adjustment was incorrectly collected and in turn, invalid. The data engineering unit 460 filters out each invalid user-initiated adjustment from the aggregated data. For example, if a value for the picture setting item Brightness is adjusted to a new value 50 that is out of range (i.e., not within a corresponding value range of [−5, +5]), the data engineering unit 460 determines this particular adjustment is invalid, and filters out this particular adjustment from the aggregated data.

In one embodiment, pre-processing aggregated data further comprises the data engineering unit 460 determining if each user-initiated adjustment included in the aggregated data is active. For example, in one embodiment, the data engineering unit 460 determines, for each consumer electronic device 110 with a corresponding device identifier included in the aggregated data, a degree of activeness corresponding to the consumer electronic device 110. A degree of activeness corresponding to a consumer electronic device 110 is a measurement indicative of frequency of user-initiated adjustments to picture setting items (with numerical values) of the consumer electronic device 110 over a pre-determined period of time (e.g., 1 month).

In one embodiment, a degree of activeness corresponding to a consumer electronic device 100 is determined in accordance with equation (1) provided below:

$$activeness = \frac{\text{total number of adjustments to any picture setting items with numerical values}}{\text{total number of days in pre-determined period of time}}. \quad (1)$$

For example, if a total number of user-initiated adjustments to any picture setting items with numerical values is 35, and a total number of days in a pre-determined period of time is 30, a degree of activeness corresponding to a consumer electronic device 110 that the user-initiated adjustments are collected from is 1.16 changes per day.

In one embodiment, if a degree of activeness corresponding to a consumer electronic device 110 is insufficient (e.g., less that a pre-determined activeness threshold), the data engineering unit 460 determines the consumer electronic device 110 is unqualified (i.e., has very few user-initiated adjustments to picture setting items) and in turn, all user-initiated adjustments included in the aggregated data and associated with a device identifier corresponding to the consumer electronic device 110 are inactive. Inactive user-initiated adjustments to picture setting items are assumed to be adjustments made without clear user intention of picture quality adjustment (e.g., random changes). The data engineering unit 460 filters out each inactive user-initiated adjustment from the aggregated data (i.e., all user-initiated adjustments collected from unqualified consumer electronic devices 110 are filtered out from the aggregated data).

In one embodiment, pre-processing aggregated data to filter out invalid and inactive user-initiated adjustments results in filtered aggregated data comprising only valid and active user-initiated adjustments. In one embodiment, the data engineering unit 460 generates training data comprising only valid and active user-initiated adjustments (i.e., the training data is the resulting filtered aggregated data). Valid and active user-initiated adjustments to picture setting items are assumed to be adjustments made with clear user intention of picture quality adjustment (e.g., not random changes). Pre-processing aggregated data in this manner facilitates generation of high-quality training data comprising meaningful user-initiated adjustments (i.e., adjustments made with clear intention).

Table 2 below provides example user-initiated adjustments to picture setting items (with numerical values) that are collected from a particular consumer electronic device 110, in one or more embodiments.

TABLE 2

| Device ID | Backlight | Contrast | Brightness | Sharpness | Color |
|---|---|---|---|---|---|
| AAA3D | 25 | 25 | 0 | 10 | 25 |
| AAA3D | 25 | 25 | 0 | 10 | <u>30</u> |
| AAA3D | <u>22</u> | 25 | 0 | 10 | <u>31</u> |
| AAA3D | 22 | 25 | 0 | 10 | 31 |
| AAA3D | 22 | 25 | 0 | <u>8</u> | 31 |

For ease of reference, a value for a picture setting item is underlined in Table 2 if the value results from a user-initiated adjustment. As shown in Table 2, the user-initiated adjustments to picture setting items (with numerical values) include adjusting a value for the picture setting item Color from 25 to 30 then to 31, adjusting a value for the picture setting item Backlight from 25 to 22, and adjusting a value for the picture setting item Sharpness from 10 to 8. The total number of picture setting items adjusted is 3 (i.e., Color, Backlight, and Sharpness).

In one embodiment, a pre-determined activeness threshold is obtained via machine learning experimentation. For example, in one embodiment, the machine learning experimentation includes the following steps: First, set a prediction task (e.g., predict a value for the picture setting item Picture Mode). Second, prepare multiple sets of training data with threshold values ranging from X to Y. Third, for each set of training data, measure predictive performance (i.e., predictive accuracy) of a machine learning model trained based on the set of training data. Fourth, if a machine learning model with the highest predictive performance is trained based on a set of training data with a particular threshold value, set a pre-determined activeness threshold to the particular threshold value.

In one embodiment, training data (generated by the data engineering unit 460) comprises: (1) one or more labels representing one or more valid and active user-initiated adjustments to one or more picture setting items, and (2) one or more input features representing one or more user situations (e.g., time, location) in which the one or more user-initiated adjustments occurred (i.e., captured or observed).

In one embodiment, the data engineering unit 460 is configured to transmit training data (generated by the data engineering unit 460) to another component. As described in detail later herein, in one embodiment, the data engineering unit 460 transmits training data to an external component, such as a picture setting behavior learning unit 470 deployed at a cloud computing environment 300.

In one embodiment, the data engineering unit 460 is configured to generate a plurality of training data that are transmitted to a plurality of picture setting behavior learning units 470. For example, in one embodiment, the data engineering unit 460 is configured to generate a first training data that is transmitted to a first picture setting behavior learning unit 470 for training a first machine learning model 480 to learn user-initiated adjustments to the picture setting item Picture Mode made by users located in a first geographical region/country (e.g., the United States), a second training data that is transmitted to a second picture setting behavior learning unit 470 for training a second machine learning model 480 to learn user-initiated adjustments to the picture setting item Brightness made by users located in a second geographical region/county (e.g., Korea), and a third training data that is transmitted to a third picture setting behavior learning unit 470 for training a third machine learning model 480 to learn user-initiated adjustments to the picture setting items Picture Mode and Brightness made by all users.

In one embodiment, the system 450 comprises a picture setting behavior learning unit 470 deployed at a cloud computing environment 300. In one embodiment, the picture setting behavior learning unit 470 is configured to: (1) receive, as input, training data (e.g., from the data engineering unit 460), wherein the training data comprises labels and input features representing user-initiated adjustments to picture setting items and user situations in which the adjustments were observed, respectively, and (2) train a machine learning model 480 to learn relationships between the labels and the input features based on the training data (i.e., learn the picture setting behaviors represented by the adjustments). After training, the resulting trained machine learning model 480 is deployed (e.g., at the cloud computing environment 300) to predict (i.e., recommend) a picture setting appropriate (i.e., suitable) for a current user situation.

In one embodiment, a trained machine learning model 480 is configured to: (1) receive, as input, a current user situation (i.e., a given current context) (e.g., from a situational picture setting unit 420), (2) predict a picture setting appropriate for the current user situation, and (3) transmit the predicted picture setting to another component (e.g., the situational picture setting unit 420).

For example, in one embodiment, a picture setting behavior learning unit 470 is configured to train a machine learning model 480 to learn picture setting behaviors of users located in the United States who made user-initiated adjustments to the picture setting item Picture Mode over a period of time (i.e., historical picture setting behaviors). After training, the resulting trained machine learning model 480 is deployed to predict, for a user located in the United States, an appropriate categorical value for the picture setting item Picture Mode based on a current situation of the user. For example, if the current situation indicates that the user is watching cinematic content in a dark room and the machine learning model 480 is trained to learn that users located in the United States adjust the picture setting item Picture Mode to Movie in similar situations, the machine learning model 480 predicts Movie as the appropriate categorical value for the picture setting item Picture Mode.

In one embodiment, before a machine learning model 480 (trained by the picture setting behavior learning unit 470) is deployed, the picture setting behavior learning unit 470 is configured to validate the machine learning model 480 by measuring predictive performance (i.e., predictive accuracy) of the machine learning model 480. For example, in one embodiment, the predictive performance is measured by feeding the machine learning model 480 with a pre-determined amount of training data used to train the machine learning model 480, and comparing resulting predicted values against observed values. If the predictive performance is reasonable (e.g., the predictive performance exceeds a pre-determined threshold amount), the machine learning model 480 is validated and can be deployed.

In one embodiment, the system 450 comprises a plurality of picture setting behavior learning units 470 that train a plurality of machine learning models 480 to learn a variety of picture setting behaviors. For example, in one embodiment, the plurality of machine learning models 480 include a first machine learning model 480 trained to learn user-initiated adjustments to the picture setting item Picture Mode made by users located in the United States, a second machine learning model 480 trained to learn user-initiated adjustments to the picture setting item Brightness made by users located in Korea, and a third machine learning model 480 trained to learn user-initiated adjustments to the picture setting items Picture Mode and Brightness made by all users.

In one embodiment, the system 400 comprises a situational picture setting unit 420 deployed at a consumer electronic device 110. The situational picture setting unit 420 is configured to: (1) capture current situational information representing a current situation of a user via one or more software and/or hardware sensors, (2) transmit the captured current situational information to one or more trained machine learning models 480 (e.g., deployed at the cloud computing environment 300), (3) receive, as input, one or more predicted picture settings for the current situation of the user (e.g., from the one or more machine learning models 480), wherein the one or more predicted picture settings include one or more predicted values for one or more picture setting items, and (4) optimize picture quality of the consumer electronic device 110 in accordance with the one or more predicted picture settings.

In one embodiment, the situational picture setting unit 420 optimizes the picture quality by automatically adjusting one or more picture setting items of the consumer electronic device 110 in accordance with the one or more predicted picture settings (e.g., adjusting values for the picture setting items to the predicted values). In another embodiment, the situational picture setting unit 420 optimizes the picture quality by displaying to a user a recommendation of the one or more predicted picture settings (e.g., on a display screen of the consumer electronic device 110 or another consumer electronic device 110 within proximity of the user, such as a smartphone), wherein the recommendation prompts the user for permission to adjust one or more picture setting items of the consumer electronic device 110 in accordance with the recommendation. The situational picture setting unit 420 adjusts the one or more picture setting items in accordance with the one or more predicted picture settings in response to receiving permission from the user.

In one embodiment, the system 400 comprises a user feedback unit 430 deployed at a consumer electronic device 110. The user feedback unit 430 is configured to collect user feedback regarding current picture quality of the consumer electronic device 110 in response to an adjustment (via a situational picture setting unit 420) of one or more picture setting items of the consumer electronic device 110 in accordance with one or more predicted picture settings. The user feedback comprises one or more responses from one or more users ("user responses"), wherein the user responses are indicative of whether the one or more users are satisfied with the current picture quality. The user feedback can be explicit or implicit. For example, in one embodiment, the user feedback unit 430 is configured to collect implicit user feedback by monitoring behavior of an individual user ("user behavior") in response to the adjustment, and determining whether the individual user is satisfied with the current picture quality based on the monitored user behavior. As another example, in one embodiment, the user feedback unit 430 is configured to collect explicit user feedback by prompting an individual user to provide one or more user responses regarding the current picture quality, and recording the one or more user responses. For example, the user feedback unit 430 may provide for display (e.g., on a display screen of the consumer electronic device 110 or another consumer electronic device 110 within proximity of the user, such as a smartphone) a question inquiring about the current picture quality (e.g., "Do you like the current picture quality?").

In one embodiment, user feedback collected by the user feedback unit 430 is used to improve overall performance of one or more machine learning models 480. For example, in one embodiment, the user feedback unit 430 is configured to feed the user feedback to a data engineering unit 460 that utilizes the user feedback to refine training data generated by the data engineering unit 460. For example, if the user feedback includes one or more positive user responses for a particular picture setting behavior, the date engineering unit 460 refines the training data by increasing a weight of the particular picture setting behavior, such that a machine learning model 480 trained based on the refined training data learns the particular picture setting behavior. In one embodiment, one or more machine learning models 480 are fine-tuned/adjusted/updated based on user feedback.

In one embodiment, the entire workflow (i.e., pipeline) can be executed continuously to maintain highest user-perceived picture quality possible for hardware and/or software capabilities of a consumer electronic device 110.

In one embodiment, one or more portions of the workflow (i.e., pipeline) can be individually executed for a specific geographical region, a specific device model number, or a specific user group (e.g., race, sex, age, etc.) to improve quality of situational picture settings.

In one embodiment, multiple data collection units 410 are deployed at multiple consumer electronic devices 110 (e.g., a smart television, a smartphone, etc.) of a user to collaboratively collect diverse current situational information about a current situation of the user.

In one embodiment, the data engineering unit 460, each picture setting behavior learning unit 470, and each machine learning model 480 are deployed at one or more edge computing environments instead of a cloud computing environment 300 for increased safety, increased scalability, and increased reliability for big data processing and machine learning.

In one embodiment, an optional data security unit is deployed at either a consumer electronic device 110 or a cloud computing environment 300 to provide privacy protection between the data collection unit 410 and a picture setting behavior learning unit 470. In one embodiment, the data security unit is configured to: (1) receive device setting behavioral data from a data collection unit 410, (2) protect the device setting behavioral data via encryption or obfuscation (i.e., to remove personal or private information), and (3) transmit the resulting encrypted or obfuscated data to an external component (e.g., a picture setting behavior learning unit 470), thereby minimizing potential security and/or privacy risks.

In one embodiment, the systems 400 and 450 are deployed for other application uses involving other types of device setting behaviors, such as audio settings, etc. For example, in one embodiment, the systems 400 and 450 are used to train a machine learning model to learn user-initiated adjustments to audio setting items (e.g., adjusting a value for an audio setting item Sound Mode from Standard to AMPLIFY) observed in user situations (e.g., time, location, etc.).

Figure 3:
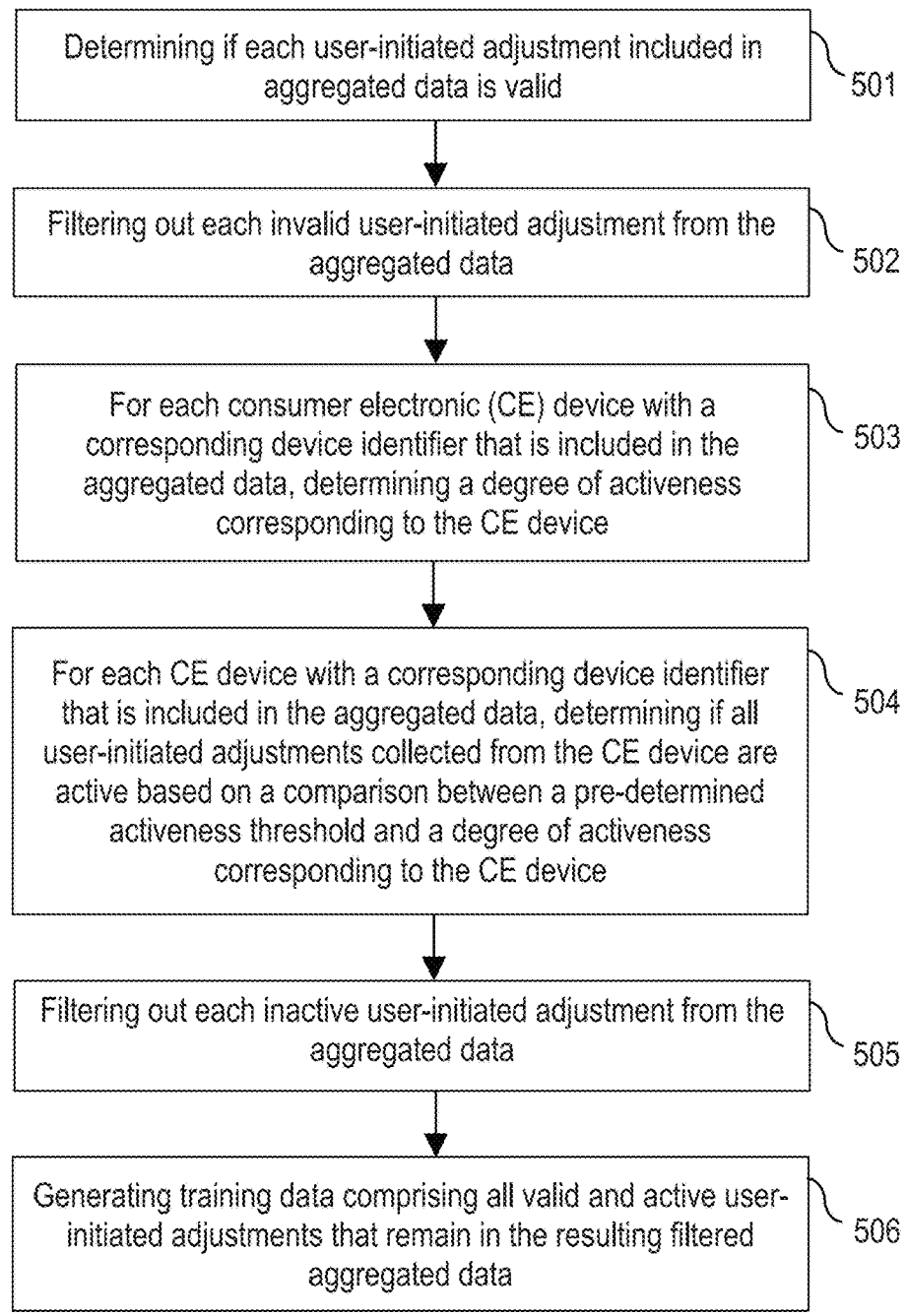
FIG. 3 is a flowchart of an example process for pre-processing aggregated data, in one or more embodiments.

FIG. 3 is a flowchart of an example process 500 for pre-processing aggregated data, in one or more embodiments. Process block 501 includes determining if each user-initiated adjustment included in aggregated data is valid. Process block 502 includes filtering out each invalid user-initiated adjustment from the aggregated data (e.g., filtering out user-initiated adjustments to picture setting items that result in out of range values). Process block 503 includes, for each consumer electronic device with a corresponding device identifier that is included in the aggregated data, determining a degree of activeness corresponding to the consumer electronic device. Process block 504 includes, for each consumer electronic device with a corresponding device identifier that is included in the aggregated data, determining if all user-initiated adjustments collected from the consumer electronic device are active based on a comparison between a pre-determined activeness threshold and a degree of activeness corresponding to the consumer electronic device. Process block 505 includes filtering out each inactive user-initiated adjustment from the aggregated data (i.e., filtering out user-initiated adjustments to picture setting items that are collected from a consumer electronic device with a degree of activeness that is less than a pre-determined activeness threshold). Process block 506 includes generating training data comprising all valid and active user-initiated adjustments that remain in the resulting filtered aggregated data.

In one embodiment, process blocks 501-506 may be performed by the data engineering unit 460.

Figure 4:
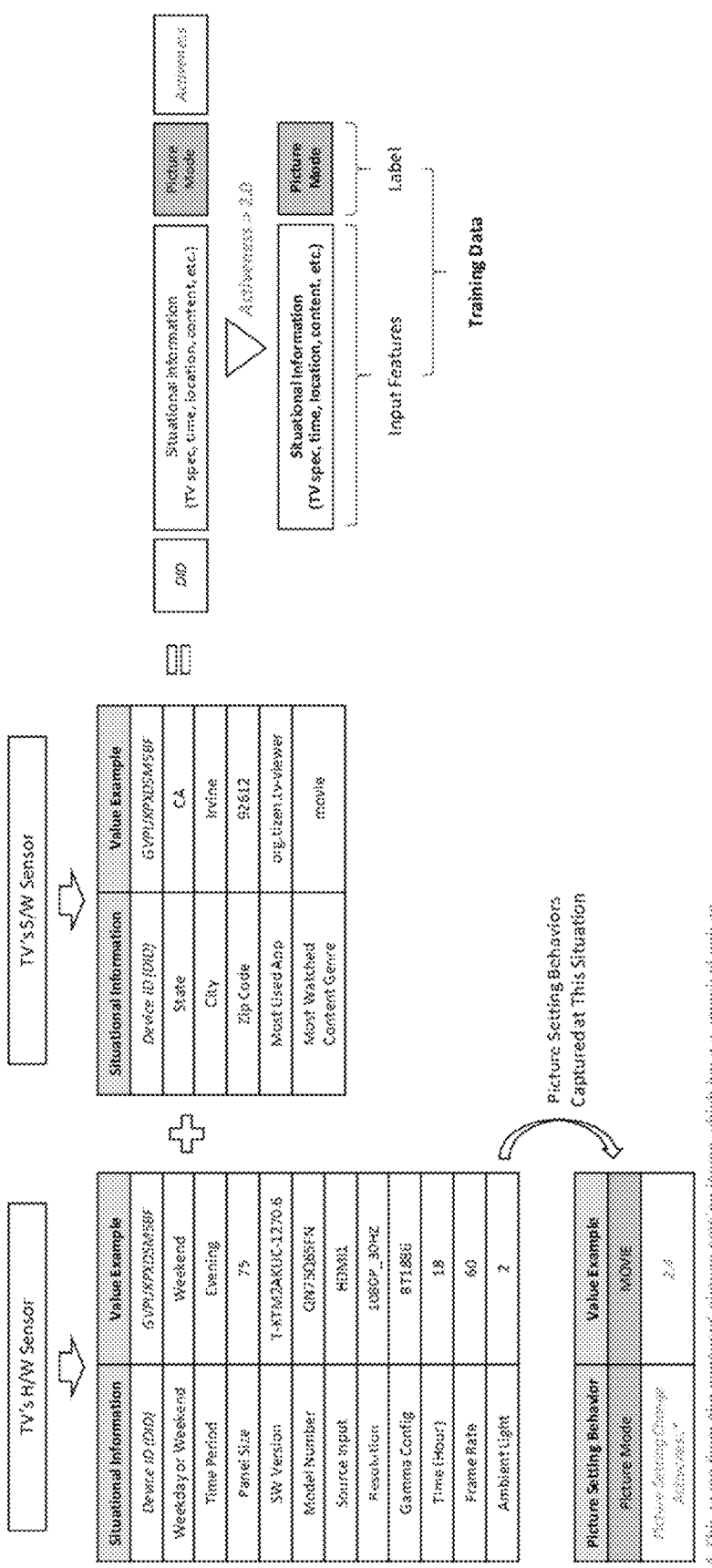
FIG. 4 illustrates example generation of training data for training a machine learning model to learn picture setting behaviors involving user-initiated adjustments to picture settings such as choice of Picture Mode, in one or more embodiments.

FIG. 4 illustrates example generation of training data for training a machine learning model to learn picture setting behaviors involving user-initiated adjustments to picture settings such as choice of Picture Mode, in one or more embodiments. Assume a consumer electronic device 110 is a smart television with a device identifier (Device ID or DID). As shown in FIG. 4, a data collection unit 410 deployed at the smart television collects data indicative of: (1) a user-initiated adjustment to the picture setting item Picture Mode, and (2) corresponding situational information (e.g., Ambient Light, Time Period, Panel Size, Zip Code, Most Used App, etc.) representing a user situation in which the adjustment occurred. The collected data is captured via one or more software (S/W) sensors and one or more hardware (H/W) sensors coupled to or integrated in the smart television. The user-initiated adjustment represents a picture setting behavior involving the picture setting item Picture Mode, and the adjustment comprises adjusting a value for the picture setting item Picture Mode to Movie.

As shown in FIG. 4, a data engineering unit 460 deployed at a cloud computing environment 300 determines a degree of activeness corresponding to the smart television is 2.4. The data engineering unit 460 determines if the user-initiated adjustment is active based on a comparison between the degree of activeness and a pre-determined activeness threshold set to 2.0. The user-initiated adjustment is determined active as the degree of activeness exceeds the pre-determined activeness threshold. As shown in FIG. 4, the data engineering unit 460 generates training data that includes the active user-initiated adjustment and the corresponding situational information.

Figure 5:
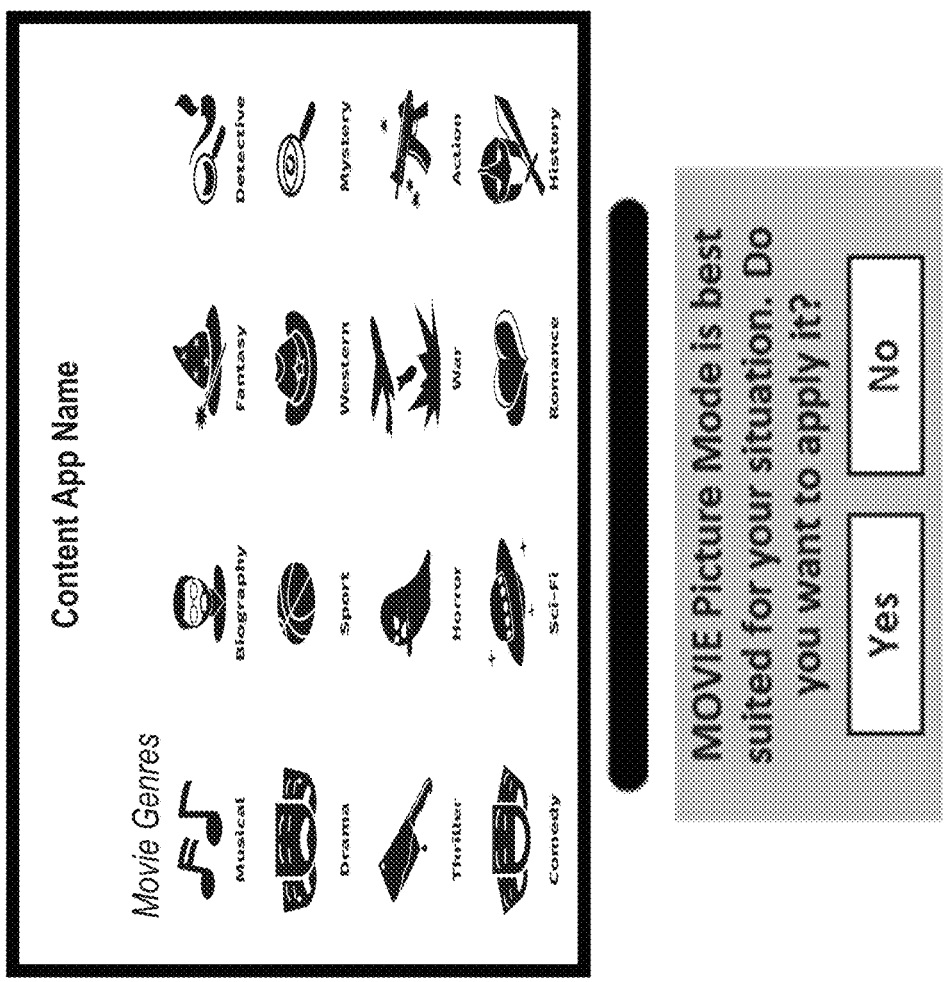
FIG. 5 illustrates an example display of a recommendation of a device setting, in one or more embodiments.

FIG. 5 illustrates an example display of a recommendation of a device setting, in one or more embodiments. Assume a consumer electronic device 110 is a smart television where a default categorical value for the picture setting item Picture Mode is Standard. A situational picture setting unit 420 deployed at the smart television provides for display a recommendation of a picture setting, wherein the picture setting is predicted by a trained machine learning model 480 (e.g., deployed at the cloud computing environment 300) based on a current situation of a user utilizing the smart television. The current situation of the user indicates that the user is interested in watching a movie. As shown in FIG. 5, the user has launched a content app on a display screen of the smart television (e.g., the text "Content App Name" represents a name of the content app, e.g., Netflix®). The content app presents to the user different movies available for user selection (e.g., the text "Movie Genres" represents different categories of movies available within the content app for user selection). The recommendation is displayed on a display screen (e.g., the display screen of the smart television or another consumer electronic device 110 within proximity of the user, such as a smartphone). The recommendation informs the user that a recommended picture mode choice (i.e., recommended categorical value for the picture setting item Picture Mode) is Movie based on the current situation of the user. The recommendation also prompts the user for permission to adjust picture quality of the smart television in accordance with the recommended picture mode choice. The situational picture setting unit 420 adjusts the picture setting item Picture Mode from the default categorial value Standard to the recommended categorical value Movie in response to receiving permission from the user.

Figure 6:
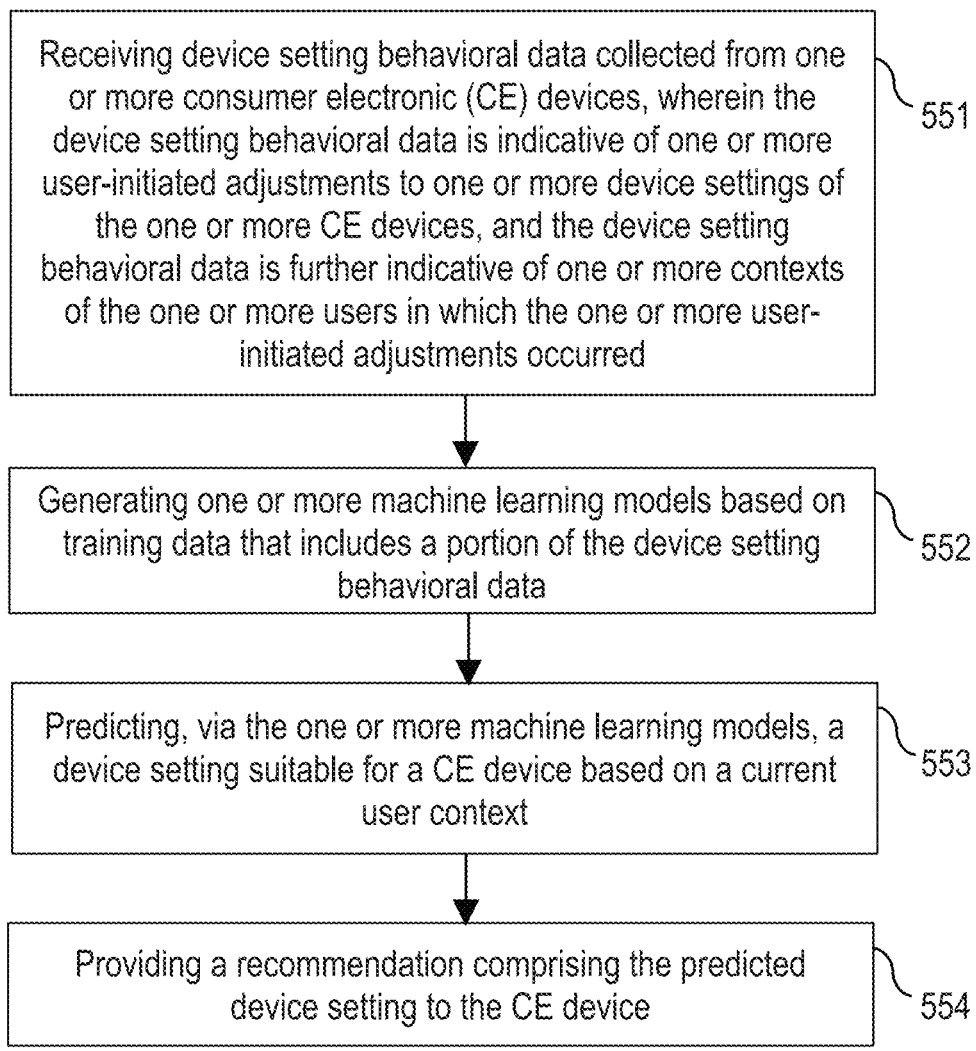
FIG. 6 is a flowchart of an example process for implementing providing situational device settings for a consumer electronic device, in one or more embodiments.

FIG. 6 is a flowchart of an example process 550 for implementing providing situational device settings for a consumer electronic device, in one or more embodiments. Process block 551 includes receiving device setting behavioral data collected from one or more consumer electronic devices (e.g., consumer electronic devices 110), wherein the device setting behavioral data is indicative of one or more user-initiated adjustments to one or more device settings (e.g., picture settings) of the one or more consumer electronic devices, and the device setting behavioral data is further indicative of one or more contexts (e.g., user situations) of the one or more users in which the one or more user-initiated adjustments occurred (i.e., captured or observed). Process block 552 includes generating one or more machine learning models (e.g., machine learning models 480) based on training data that includes a portion of the device setting behavioral data. Process block 553 includes predicting, via the one or more machine learning models, a device setting (e.g., predicted picture setting) suitable for a consumer electronic device (e.g., consumer electronic device 110) based on a current user context (e.g., current user situation). Process block 554 includes providing a recommendation comprising the predicted device setting to the consumer electronic device.

In one embodiment, process blocks 551-554 may be performed by one or more components of the system 450, such as the data engineering unit 460, one or more picture setting behavior learning units 470, and one or more machine learning models 480.

Figure 7:
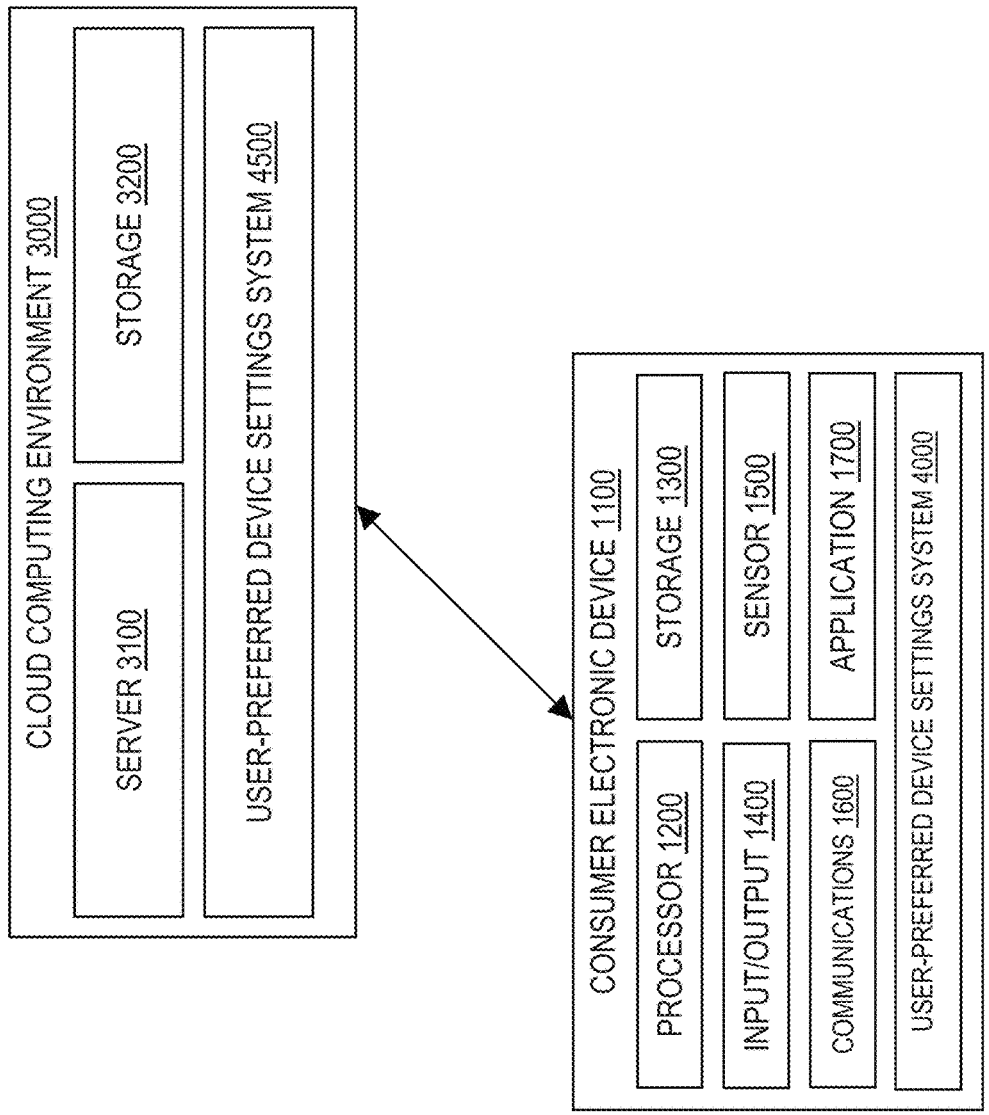
FIG. 7 illustrates an example computing architecture for implementing discovering user-preferred device settings for a consumer electronic device, in one or more embodiments.

FIG. 7 illustrates an example computing architecture 1000 for implementing discovering user-preferred device settings for a consumer electronic device 1100, in one or more embodiments. The computing architecture 1000 comprises a consumer electronic device 1100 including resources, such as one or more processor units 1200 and one or more storage units 1300. One or more applications may execute/operate on the consumer electronic device 1100 utilizing the resources of the consumer electronic device 1100.

In one embodiment, the one or more applications on the consumer electronic device 1100 include a first user-preferred device settings system 4000 configured to adjust one or more device settings (e.g., picture settings) of the consumer electronic device 1100 based on one or more newly discovered user-preferred device settings. As described in detail later herein, in one embodiment, the first user-preferred device settings system 4000 is configured to collect device setting behavioral data, and transmit the device setting behavioral data to a second user-preferred device settings system 4500 deployed at a cloud computing environment 3000.

In one embodiment, the device setting behavioral data comprises: (1) picture setting behavior information representing user-initiated adjustments to picture settings items of the consumer electronic device 1100, wherein the adjustments represent behaviors (i.e., patterns) of the user in relation to picture setting ("picture setting behaviors"), and (2) device-related information for the consumer electronic device 1100. The device-related information comprises, but is not limited to, one or more device properties such as device model number, panel type, screen resolution, etc.

In one embodiment, a portion of the device setting behavioral data is used by the second situational device settings system 4500 to train one or more machine learning models 4800 (FIG. 8) to cluster users who share common user preferences for device setting ("common device setting user preferences") into user groups. After training, each resulting trained machine learning model 4800 is deployed at the cloud computing environment 4500 for clustering. For each user group resulting from the clustering, the second situational device settings system 4500 is configured to discover a user-preferred device setting that users of the user group prefer most. For example, if the user-preferred device setting is a user-preferred picture setting, the user-preferred picture setting comprises a set of picture settings items and corresponding values for the picture setting items that together represent a newly discovered user-preferred picture mode choice (i.e., a new categorical value for the picture setting item Picture Mode that is not a pre-existing/default categorical value).

In one embodiment, the first user-preferred device settings system 4000 is configured to: (1) receive a newly discovered user-preferred device setting for the consumer electronic device 1100 (e.g., from the second situational device settings system 4500), and (2) adjust a device setting of the consumer electronic device 1100 based on the newly discovered user-preferred device setting. For example, if the newly discovered user-preferred device setting is a newly discovered user-preferred picture mode choice, the first user-preferred device settings system 4000 includes the newly discovered user-preferred picture mode choice in a list of available picture mode choices presented to the user for selection.

Examples of a consumer electronic device 1100 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), a set-top box, an Internet of things (IoT) device, an audio device (e.g., an audio speaker), etc.

In one embodiment, the consumer electronic device 1100 comprises one or more hardware and/or sensor units 1500 integrated in or coupled to the consumer electronic device 1100, such as a camera, a microphone, a GPS, a motion sensor, etc.

In one embodiment, the consumer electronic device 1100 comprises one or more I/O units 1400 integrated in or coupled to the consumer electronic device 1100. In one embodiment, the one or more I/O units 1400 include, but are not limited to, a PUI and/or a GUI, such as a keyboard, a keypad, a touch interface, a touch screen, a knob, a button, a display screen, etc. In one embodiment, a user can utilize at least one I/O unit 1400 to configure one or more user preferences, configure one or more parameters and/or thresholds, provide user responses, etc.

In one embodiment, the one or more applications on the consumer electronic device 1100 may further include one or more software mobile applications 1700 loaded onto or downloaded to the consumer electronic device 1100, such as a camera application, a social media application, a video streaming application, etc. A software mobile application 1700 on the consumer electronic device 1100 may exchange data with the system 4000.

In one embodiment, the consumer electronic device 1100 comprises a communications unit 1600 configured to exchange data with the cloud computing environment 3000 over a communications network/connection (e.g., a wireless connection such as a Wi-Fi connection or a cellular data connection, a wired connection, or a combination of the two). The communications unit 1600 may comprise any suitable communications circuitry operative to connect to a communications network and to exchange communications operations and media between the consumer electronic device 1100 and other devices connected to the same communications network. The communications unit 1600 may be operative to interface with a communications network using any suitable communications protocol such as, for example, Wi-Fi (e.g., an IEEE 802.11 protocol), Bluetooth high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the cloud computing environment 3000 provides a shared pool of configurable computing system resources including servers 3100 and storage units 3200. The cloud computing environment 3000 further provides higher-level services including the second user-preferred device settings system 4500. As described in detail later herein, in one embodiment, the second user-preferred device settings system 4500 is configured to generate a user feature matrix based on device setting behavioral data collected from multiple consumer electronic devices 1100, wherein the user feature matrix is used to train a machine learning model 4800.

Figure 8:
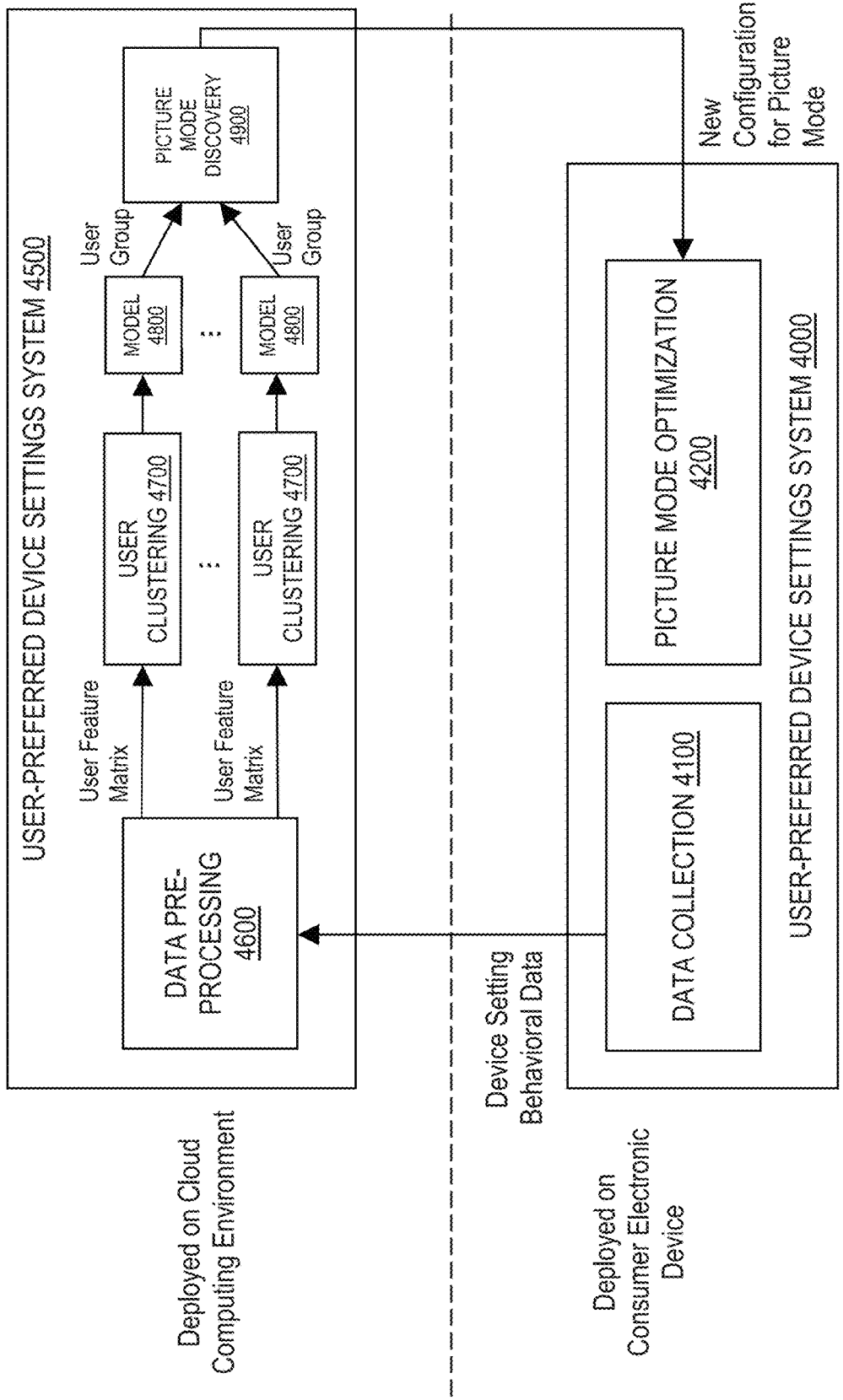
FIG. 8 illustrates an example workflow for implementing discovering user-preferred device settings for a consumer electronic device, in one or more embodiments.

FIG. 8 illustrates an example workflow for implementing discovering user-preferred device settings for a consumer electronic device 1100, in one or more embodiments. In one embodiment, the first user-preferred device settings system 4000 comprises a data collection unit 4100 deployed at the consumer electronic device 1100. In one embodiment, the data collection unit 4100 is configured to collect different types of data, wherein the different types of data comprise: (1) picture setting behavior information representing one or more behaviors (i.e., patterns) of one or more users in relation to adjusting one or more picture setting items of the consumer electronic device 1100 ("picture setting behaviors"), and (2) device-related information for the consumer electronic device 1100. The device-related information comprises one or more device properties such as, but not limited to, device model number, panel type, screen resolution, etc.

In one embodiment, the data collection unit 4100 is configured to determine one or more picture setting behaviors of one or more users by: (1) detecting/recognizing one or more user-initiated adjustments to one or more user-configurable picture setting items of the consumer electronic device 1100 based on collected data, and (2) for each user-initiated adjustment, detect/recognize corresponding device-related information captured via one or more software and/or hardware sensors (e.g., sensor units 1500) during the adjustment. In one embodiment, the data collection unit 4100 determines diverse device-related information for the consumer electronic device 1100.

In one embodiment, the data collection unit 4100 is configured to: (1) generate device setting behavioral data by integrating user-initiated adjustments representing picture setting behaviors with corresponding device-related information into a structured data format (e.g., a table), and (2) transmit the device setting behavioral data to another component. As described in detail later herein, in one embodiment, the data collection unit 4100 transmits device setting behavioral data to an external component, such as a data pre-processing unit 4600 deployed at a cloud computing environment 3000.

In one embodiment, the system 4500 comprises a data pre-processing unit 4600 deployed at a cloud computing environment 3000. In one embodiment, the data pre-processing unit 4600 is configured to: (1) receive, as input, a plurality of device setting behavioral data from a plurality of consumer electronic devices 1100 (e.g., collected via data collection units 4100 deployed at the consumer electronic devices 1100), (2) aggregate the plurality of device setting behavioral data, (3) filter out data from the resulting aggregated data based on pre-determined filtering criteria, and (4) generate at least one user feature vector corresponding to at least one user based on the resulting filtered out data, wherein each user feature vector represents one or more historical user preferences with respect to picture setting.

In one embodiment, the resulting aggregated data comprises: (1) one or more user-initiated adjustments to one or more picture setting items, and (2) for each user-initiated adjustment, a corresponding device identifier (e.g., Device ID) identifying a particular consumer electronic device 1100 that the adjustment was collected from (i.e., the adjustment is associated/tagged with the device identifier).

In one embodiment, a target user group is designated as part of pre-determined filtering criteria for filtering. For example, in one embodiment, after the data pre-processing unit 4600 aggregates a pre-determined amount of structured data (e.g., the pre-determined amount is the last three months of picture setting behaviors captured), the data pre-processing unit 4600 filters out the resulting aggregated data to focus on the target user group, such that the resulting filtered out data includes only picture setting behaviors of users of the target user group. In another embodiment, a target user group is not designated as part of pre-determined filtering criteria for filtering, such that the data pre-processing unit 4600 filters out aggregated data without focus on any target user group (i.e., resulting filtered out data includes picture setting behaviors of all users).

In one embodiment, a particular picture setting item is designated as part of pre-determined filtering criteria for filtering. For example, in one embodiment, the data pre-processing unit 4600 filters out from aggregated data user-initiated adjustments to the particular picture setting item, such that the resulting filtered out data includes only picture setting behaviors involving the particular picture setting item.

In one embodiment, for each individual user with a picture setting behavior included in filtered out data, the data pre-processing unit 4600 is configured to calculate averages of the user's adjustments to picture setting items with numerical values, and transform the averages into a normalized user feature vector (e.g., min-max normalization) corresponding to the user.

In one embodiment, the data pre-processing unit 4600 is configured to: (1) generate a matrix ("user feature matrix") comprising a set of user feature vectors, and (2) transmit the user feature matrix to another component. As described in detail later herein, in one embodiment, the data pre-processing unit 4600 transmits a user feature matrix to an external component, such as a user clustering unit 4700 deployed at a cloud computing environment 3000.

In one embodiment, the data pre-processing unit 4600 is configured to generate and transmit a plurality of user feature matrices. For example, in one embodiment, the data pre-processing unit 4600 generates and transmits a first user feature matrix to a first user clustering unit 4700 for clustering users who adjusted the picture setting item Picture Mode to Standard into user groups, and further generates and transmits a second user feature matrix to a second user clustering unit 4700 for clustering users who utilize a consumer electronic device 1100 with a particular device model number and adjusted the picture setting item Picture Mode to Movie into additional user groups.

In one embodiment, the system 4500 comprises one or more user clustering units 4700 deployed at a cloud computing environment 3000. In one embodiment, each user clustering unit 4700 is configured to: (1) receive, as input, a user feature matrix (e.g., from the data pre-processing unit 4600), wherein the user feature matrix comprises a set of feature vectors representing historical user preferences of a set of users in relation to picture setting, and (2) train a machine learning model 4800 to cluster users who share one or more common user preferences for picture setting ("common picture setting user preferences") into one or more user groups based on the user feature matrix.

In one embodiment, the system 4500 comprises a trained machine learning model 4800 configured to apply an unsupervised clustering algorithm (e.g., K-means, etc.) to cluster users who share one or more common picture setting user preferences into one or more user groups. For example, in one embodiment, a trained machine learning model 4800 is configured to: (1) determine an optimal number K of clusters (i.e., user groups) for a given user feature matrix (e.g., the optimal number K is determined via the Elbow method), and (2) apply K-means clustering to the given user feature matrix in order to assign each individual user to a specific user group, wherein the total number of user groups resulting from the clustering is K.

In one embodiment, the system 4500 comprises a plurality of user clustering units 4700 that train a plurality of machine learning models 4800. For example, in one embodiment, the plurality of user clustering units 4700 include a first user clustering unit 4700 for clustering users of a first set of users who utilize any smart television, and a second user clustering unit 4700 for clustering users of a second set of users who utilize a smart television with a particular device model number.

In one embodiment, the system 4500 comprises a picture mode discovery unit 4900 deployed at a cloud computing environment 3000. The picture mode discovery unit 4900 is configured to: (1) receive, as input, one or more user groups (e.g., from a machine learning model 4800), wherein each user group comprises a cluster of users who share one or more common picture setting user preferences, and (2) for each user group, discover a new configuration for picture mode choice that users of the user group prefer most, wherein the new configuration comprises a set of picture settings items and corresponding values for the picture setting items. The new configuration for picture mode choice represents a newly discovered user-preferred picture mode choice for the user group.

Overall distribution of observed values for picture setting items are mostly skewed (e.g., if the picture setting item Picture Mode is set to Movie, 85% of observed values for the picture setting item Contrast is in the range 45 to 50). In one embodiment, for a set of picture setting items included in a new configuration for picture mode choice, the picture mode discovery unit 4900 is configured to: (1) set each value for each picture setting item of the set with a numerical value to a median of observed values for the picture setting item, and (2) set each value for each picture setting item of the set with a categorical value to a mode of observed values for the picture setting item (i.e., most frequently observed value for the picture setting item).

In one embodiment, the system 4000 comprises a picture mode optimization unit 4200 deployed at a consumer electronic device 1100. In one embodiment, the picture mode optimization unit 4200 is configured to: (1) receive a new configuration for picture mode choice (e.g., from the picture mode discovery unit 4900), wherein the new configuration represents a newly discovered user-preferred picture mode choice for a certain user group who share one or more common picture setting user preferences in utilizing the consumer electronic device 1100, and (2) update a collection of available pre-existing picture mode choices for the consumer electronic device 1100 to include the newly discovered user-preferred picture mode choice. For example, in one embodiment, the newly discovered user-preferred picture mode choice is presented as a new categorical value available for user selection for the picture setting item Picture Mode. If the user selects the newly discovered user-preferred picture mode choice, the picture mode optimization unit 4200 is configured to adjust one or more pre-existing values (e.g., default values) for one or more picture setting items of the consumer electronic device 1100 in accordance with the new configuration. For example, if the new configuration is for a user group that prefers a higher value for the picture setting item Backlight (than a default value set) when the picture setting item Picture Mode is set to Movie, the picture mode optimization unit 4200 adjusts a value for the picture setting item Backlight of the consumer electronic device 1100 accordingly.

In one embodiment, updates to the collection of available pre-existing picture mode choices for the consumer electronic device 1100 are triggered remotely and/or periodically via an over-the-air software update for the consumer electronic device 1100 (e.g., the update is downloaded from the cloud computing environment 3000 to the consumer electronic device 1100).

In one embodiment, in response to receiving a new configuration for picture mode choice (e.g., from the picture mode discovery unit 4900), the picture mode optimization unit 4200 automatically updates the collection of available pre-existing picture mode choices for the consumer electronic device 1100 to include a newly discovered user-preferred picture mode choice represented by the new configuration. In another embodiment, the picture mode optimization unit 4200 displays to a user a recommendation of the newly discovered user-preferred picture mode choice (e.g., on a display screen of the consumer electronic device 1100 or another consumer electronic device 1100 within proximity of the user, such as a smartphone), wherein the recommendation prompts the user for permission to adjust one or more picture setting items of the consumer electronic device 1100 in accordance with the recommendation. The picture mode optimization unit 4200 adjust one or more pre-existing values (e.g., default values) for one or more picture setting items of the consumer electronic device 1100 in accordance with the new configuration in response to receiving permission from the user.

In one embodiment, the data pre-processing unit 4600, each user clustering unit 4700, each machine learning model 4800, and the picture mode discovery unit 4900 are deployed at one or more edge computing environments instead of a cloud computing environment 3000 for increased safety, increased scalability, and increased reliability for big data processing and machine learning.

In one embodiment, an optional data security unit is deployed at either a consumer electronic device 1100 or a cloud computing environment 3000 to provide privacy protection between the data collection unit 4100 and a user clustering unit 4700. In one embodiment, the data security unit is configured to: (1) receive device setting behavioral data from a data collection unit 4100, (2) protect the device setting behavioral data via encryption or obfuscation (i.e., to remove personal or private information), and (3) transmit the resulting encrypted or obfuscated data to an external component (e.g., a user clustering unit 4700), thereby minimizing potential security and/or privacy risks.

In one embodiment, the systems 4000 and 4500 are deployed for other application uses involving other types of device setting behaviors, such as audio settings, etc. For example, in one embodiment, the systems 4000 and 4500 are used to train a machine learning model to cluster similar users into user groups in terms of audio/sound setting behaviors, and new user-preferred audio/sound settings are discovered from the clustering.

Figure 9:
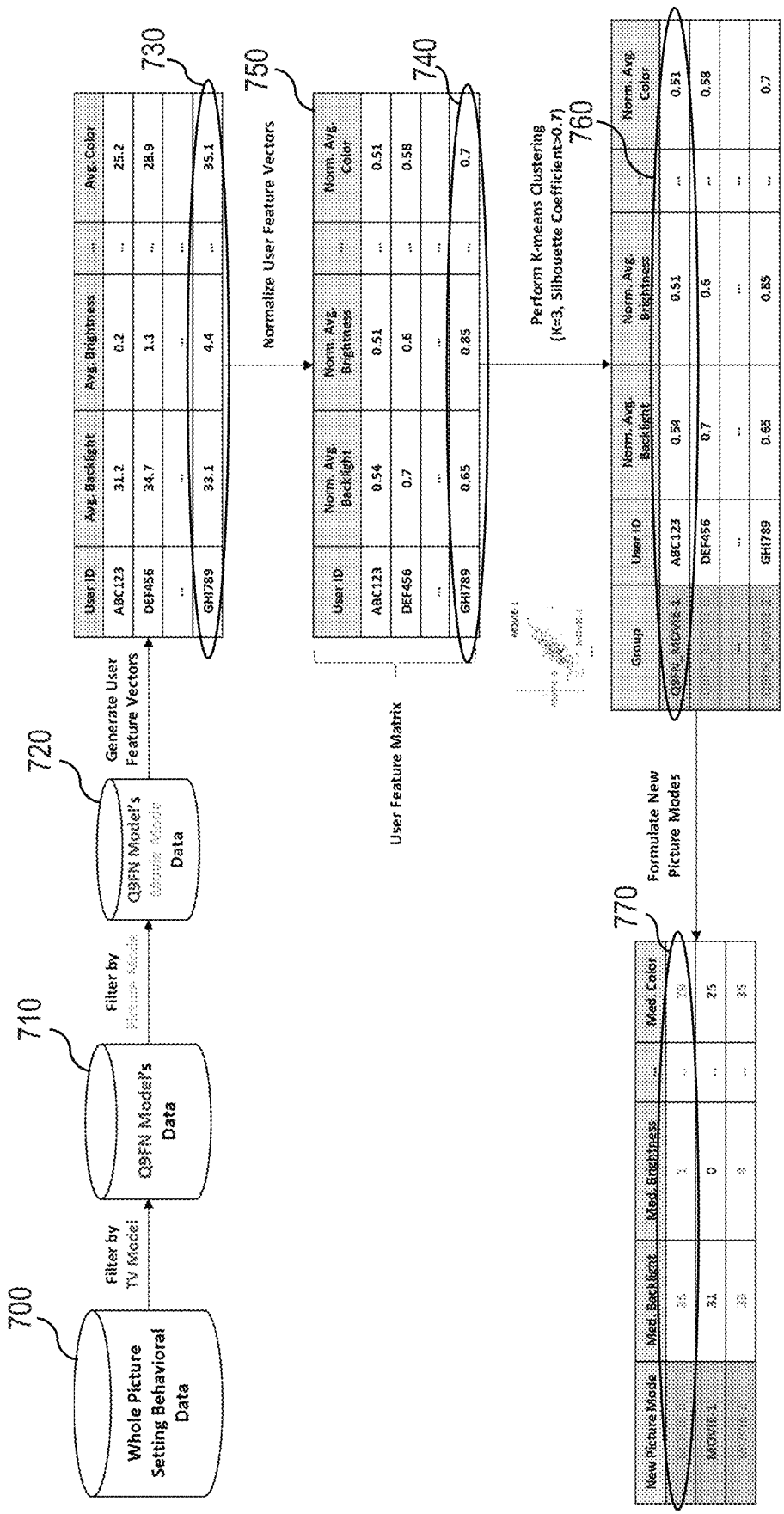
FIG. 9 illustrates example generation of a user feature matrix for training a machine learning model to cluster users who share common user preferences for picture setting into user groups, in one or more embodiments.

FIG. 9 illustrates example generation of a user feature matrix 750 for training a machine learning model to cluster users who share common picture setting user preferences into user groups, in one or more embodiments. Assume a target user group is designated as part of pre-determined filtering criteria for filtering, and the target user group comprises users who utilize a smart television with device model number Q9FN. As shown in FIG. 9, a data pre-processing unit 4600 deployed at a cloud computing environment 3000 filters out, from a first dataset 700 comprising aggregated data, user-initiated adjustments to picture setting items that are collected from smart televisions with the device model number Q9FN. The filtering results in a second dataset 710 comprising only picture setting behaviors of users of the target user group.

Assume a user-initiated adjustment that adjusts a value for the picture setting item Picture Mode to Movie is also designated as part of the pre-determined filtering criteria for filtering. As shown in FIG. 9, the data pre-processing unit 4600 further filters out, from the second dataset 710, user-initiated adjustments that adjust a value for the picture setting item Picture Mode to Movie. The additional filtering results in a third dataset 720 that comprises only picture setting behaviors of users of the target user group who utilized a smart television with the device model number Q9FN and adjusted the picture setting item Picture Mode to Movie.

As shown in FIG. 9, for each individual user with a picture setting behavior included in the third dataset 720, the data pre-processing unit 4600 generates a corresponding user feature vector 730 representing one or more historical user preferences of the user in relation to adjusting picture setting configurations under the choice Movie for the picture setting item Picture Mode. As shown in FIG. 9, the data pre-processing unit 4600 normalizes each user feature vector, and generates a user feature matrix 750 comprising each normalized user feature vector 740. The data pre-processing unit 4600 transmits the user feature matrix 750 to a user clustering unit 4700 deployed at the cloud computing environment 3000.

Assume a machine learning model 4800, deployed on the cloud computing environment 3000 and trained by the user clustering unit 4700, applies K-means clustering, and K=3. As shown in FIG. 9, the machine learning model 4800 applies K-means clustering to the user feature matrix 750 to generate three different user groups with user group identifiers Q9FN_Movie-1, Q9FN_Movie-2, and Q9FN_Movie-3. Each individual user is assigned to one of the three user groups. For example, as shown in FIG. 9, an assignment 760 assigns a user with user identifier ABC123 to the user group with user group identifier Q9FN_Movie-1. The clustering is repeated until a reasonable degree of cohesion among clustered data points is achieved (e.g., Silhouette Coefficient >0.7).

For each user group, a picture mode discovery unit 4900 deployed at the cloud computing environment 300 discovers a new configuration for picture mode choice that users of the user group prefer most, wherein the new configuration represents a newly discovered user-preferred picture mode choice for the user group. As shown in FIG. 9, the following new user-preferred picture mode choices are discovered: (1) a first new user-preferred picture mode choice with picture mode choice identifier Movie-1 for the user group with user group identifier Q9FN_Movie-1, (2) a second new user-preferred picture mode choice with picture mode choice identifier Movie-2 for the user group with user group identifier Q9FN_Movie-2, and (3) a third new user-preferred picture mode choice with picture mode choice identifier Movie-3 for the user group with user group identifier Q9FN_Movie-3.

As shown in FIG. 9, a configuration 770 for the first new user-preferred picture mode choice comprises the picture setting items Backlight, Brightness, and Color and corresponding values (i.e., {Movie-0: Backlight=35, Brightness=1, Color=29}), wherein the values for the picture setting items Backlight, Brightness, and Color are medians of observed values for the picture setting items under the dataset collected from a user group with a particular user group identifier (e.g., Q9FN_Movie-0).

Figure 10:
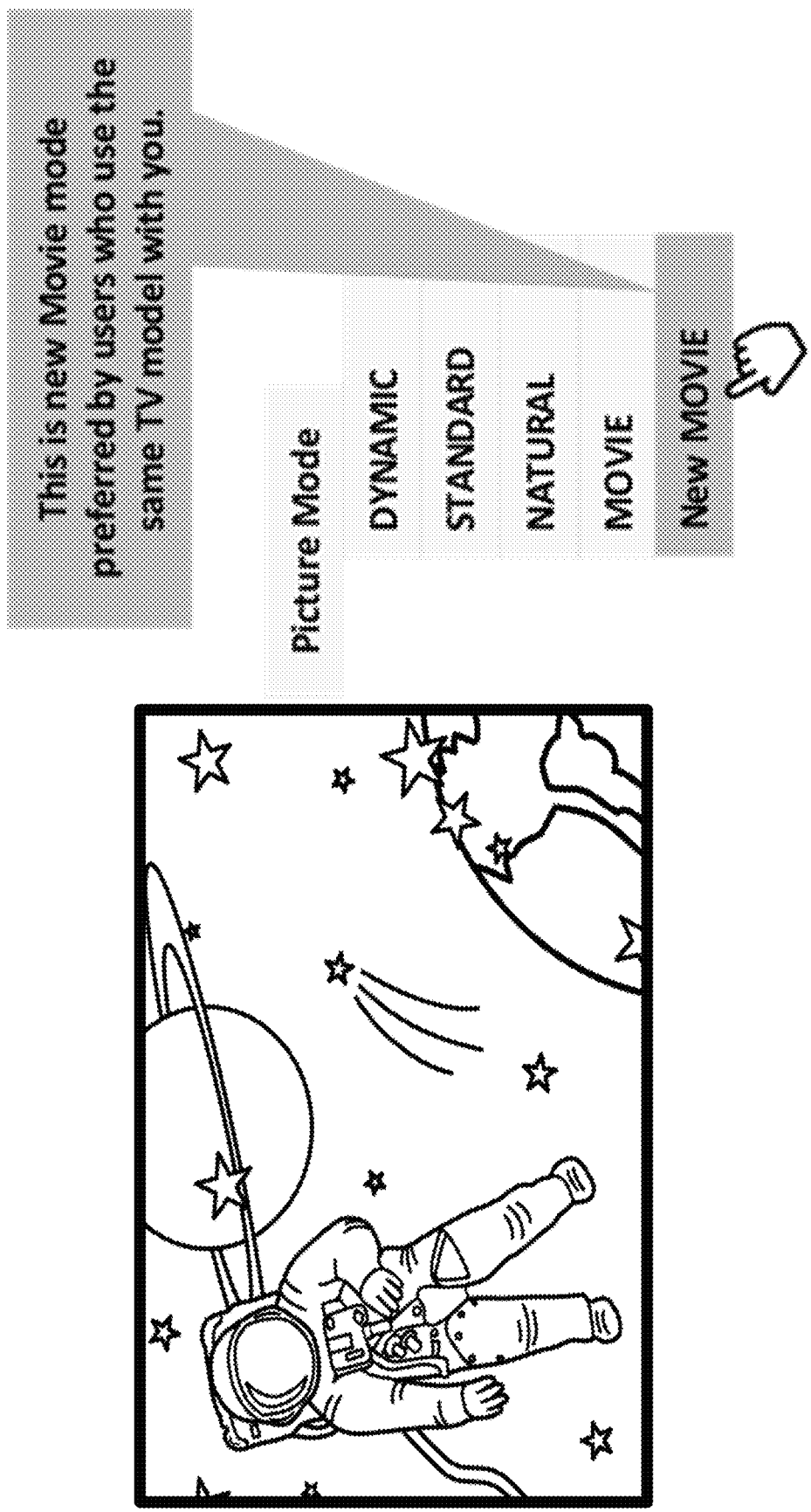
FIG. 10 illustrates an example display of a recommendation of a newly discovered user-preferred picture mode choice, in one or more embodiments.

FIG. 10 illustrates an example display of a recommendation of a newly discovered user-preferred picture mode choice, in one or more embodiments. Assume a consumer electronic device 1100 is a smart television where pre-existing categorial values for the picture setting item Picture Mode are Dynamic, Standard, Natural, and Movie. A picture mode optimization unit 4200 deployed at the smart television provides for display a recommendation of a newly discovered user-preferred picture mode choice for a user group utilizing smart televisions with the same device model number. As shown in FIG. 10, the recommendation is displayed on a display screen (e.g., a display screen of the smart television or another consumer electronic device 1100 within proximity of a user utilizing the smart television, such as a smartphone). The recommendation is included in a list of available picture mode choices available for user selection. The list includes the pre-existing categorical values Dynamic, Standard, Natural, and Movie for the picture setting item Picture Mode, and further includes a new categorical value New Movie for the picture setting item Picture Mode, wherein the new categorical value represents the newly discovered user-preferred picture mode choice. The picture mode optimization unit 4200 adjusts a value for the picture setting item Picture Mode to the new categorical value in response to user selection of the new categorical value from the list.

Figure 11:
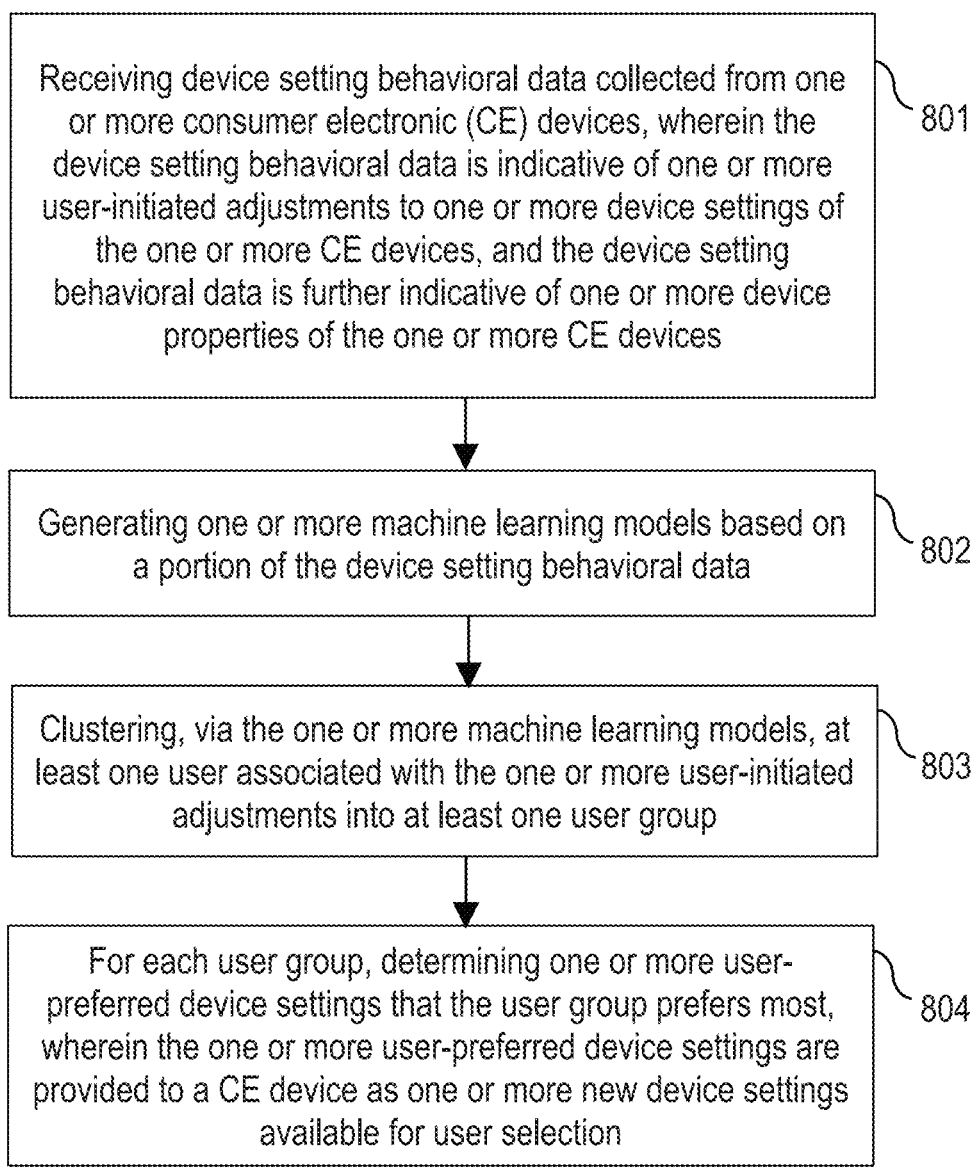
FIG. 11 is a flowchart of an example process for implementing discovering user-preferred device settings for a consumer electronic device, in one or more embodiments.

FIG. 11 is a flowchart of an example process 800 for implementing discovering user-preferred device settings for a consumer electronic device, in one or more embodiments. Process block 801 includes receiving device setting behavioral data collected from one or more consumer electronic devices (e.g., consumer electronic devices 1100), wherein the device setting behavioral data is indicative of one or more user-initiated adjustments to one or more device settings (e.g., picture settings) of the one or more consumer electronic devices, and the device setting behavioral data is further indicative of one or more device properties of the one or more consumer electronic devices. Process block 802 includes generating one or more machine learning models (e.g., machine learning models 4800) based on a portion of the device setting behavioral data. Process block 803 includes clustering, via the one or more machine learning models, at least one user associated with the one or more user-initiated adjustments into at least one user group. Process block 804 includes, for each user group, determining one or more user-preferred device settings that the user group prefers most, wherein the one or more user-preferred device settings are provided to a consumer electronic device as one or more new device settings available for user selection.

In one embodiment, process blocks 801-804 may be performed by one or more components of the system 4500, such as the data pre-processing unit 4600, one or more user clustering units 4700, one or more machine learning models 4800, and the picture mode discovery unit 4900.

Figure 12:
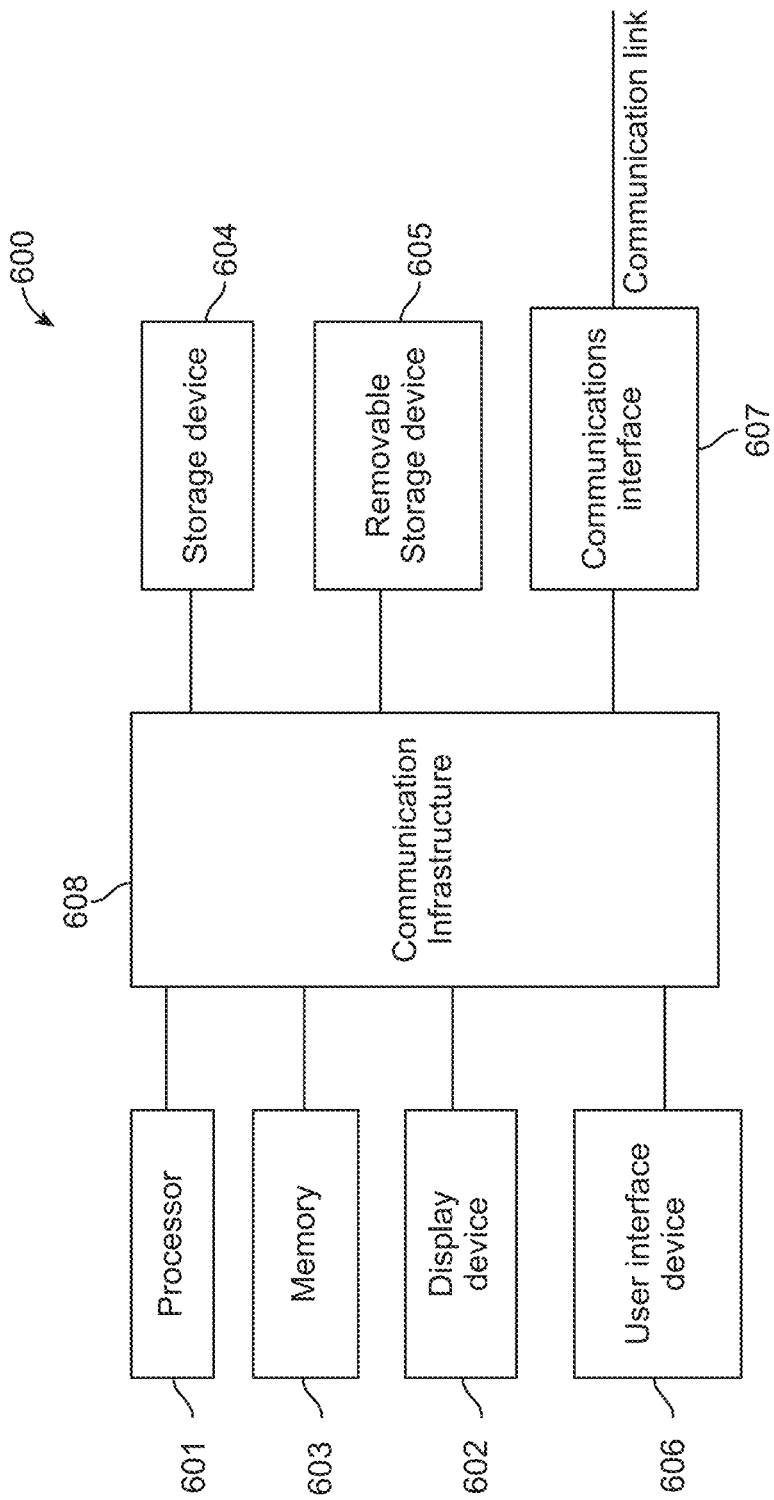
FIG. 12 is a high-level block diagram showing an information processing system comprising a computer system useful for implementing the disclosed embodiments.

FIG. 12 is a high-level block diagram showing an information processing system comprising a computer system 600 useful for implementing the disclosed embodiments. The systems 400, 450, 4000, and 4500 may be incorporated in the computer system 600. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for processes 500 (FIG. 3), 550 (FIG. 6), and 800 (FIG. 11) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    receiving device setting behavioral data collected from different consumer electronic (CE) devices, wherein the device setting behavioral data is indicative of different user-initiated adjustments to one or more device settings of the different CE devices, and the device setting behavioral data is further indicative of different user contexts in which the different user-initiated adjustments occurred;
    generating one or more machine learning models based on training data that includes a portion of the device setting behavioral data;

predicting, via the one or more machine learning models, a device setting suitable for a CE device based on a current user context, wherein the current user context is similar to one of the different user contexts; and providing a recommendation comprising the predicted device setting to the CE device.

2. The method of claim 1, wherein the CE device comprises a display screen, and the predicted device setting comprises a predicted picture setting.

3. The method of claim 2, wherein picture quality of the display screen is adjusted in accordance with the predicted picture setting.

4. The method of claim 1, further comprising:
receiving user feedback indicative of user satisfaction with the recommendation; and
updating the one or more machine learning models based on the user feedback.

5. The method of claim 1, wherein, for each of the different user-initiated adjustments, the device setting behavioral data is further indicative of a device identifier that the user-initiated adjustment is associated with.

6. The method of claim 5, further comprising:
generating the training data.

7. The method of claim 6, wherein generating the training data comprises:
for each of the different user-initiated adjustments:
determining if the user-initiated adjustment is valid; and
filtering out the user-initiated adjustment from the device setting behavioral data in response to determining the user-initiated adjustment is not valid.

8. The method of claim 7, wherein generating the training data further comprises:
for each of the different CE devices:
determining a corresponding degree of activeness over a pre-determined period of time, wherein the corresponding degree of activeness is based on each user-initiated adjustment associated with a device identifier for the CE device, and the user-initiated adjustment is an adjustment to a device setting with a numerical value;
determining if the CE device is qualified based on a comparison between the corresponding degree of activeness and a pre-determined activeness threshold; and
filtering out all user-initiated adjustments associated with the device identifier from the device setting behavioral data in response to determining the CE device is not qualified;
wherein the training data comprises remaining device setting behavioral data.

9. A system comprising:
at least one processor; and
a non-transitory processor-readable memory device storing instructions that when executed by the at least one processor causes the at least one processor to perform operations including:
receiving device setting behavioral data collected from different consumer electronic (CE) devices, wherein the device setting behavioral data is indicative of different user-initiated adjustments to one or more device settings of the different CE devices, and the device setting behavioral data is further indicative of different user contexts in which the different user-initiated adjustments occurred;

generating one or more machine learning models based on training data that includes a portion of the device setting behavioral data;
predicting, via the one or more machine learning models, a device setting suitable for a CE device based on a current user context, wherein the current user context is similar to one of the different user contexts; and
providing a recommendation comprising the predicted device setting to the CE device.

10. The system of claim 9, wherein the CE device comprises a display screen, and the predicted device setting comprises a predicted picture setting.

11. The system of claim 10, wherein picture quality of the display screen is adjusted in accordance with the predicted picture setting.

12. The system of claim 9, wherein the operations further comprise:
receiving user feedback indicative of user satisfaction with the recommendation; and
updating the one or more machine learning models based on the user feedback.

13. The system of claim 9, wherein, for each of the different user-initiated adjustments, the device setting behavioral data is further indicative of a device identifier that the user-initiated adjustment is associated with.

14. The system of claim 13, wherein the operations further comprise:
generating the training data.

15. The system of claim 14, wherein generating the training data comprises:
for each of the different user-initiated adjustments:
determining if the user-initiated adjustment is valid; and
filtering out the user-initiated adjustment from the device setting behavioral data in response to determining the user-initiated adjustment is not valid.

16. The system of claim 15, wherein generating the training data further comprises:
for each of the different CE devices:
determining a corresponding degree of activeness over a pre-determined period of time, wherein the corresponding degree of activeness is based on each user-initiated adjustment associated with a device identifier for the CE device, and the user-initiated adjustment is an adjustment to a device setting with a numerical value;
determining if the CE device is qualified based on a comparison between the corresponding degree of activeness and a pre-determined activeness threshold; and
filtering out all user-initiated adjustments associated with the device identifier from the device setting behavioral data in response to determining the CE device is not qualified;
wherein the training data comprises remaining device setting behavioral data.

17. A non-transitory processor-readable medium that includes a program that when executed by a processor performs a method comprising:
receiving device setting behavioral data collected from different consumer electronic (CE) devices, wherein the device setting behavioral data is indicative of different user-initiated adjustments to one or more device settings of the different devices, and the device setting behavioral data is further indicative of different user contexts in which the different user-initiated adjustments occurred;

generating one or more machine learning models based on training data that includes a portion of the device setting behavioral data;

predicting, via the one or more machine learning models, a device setting suitable for a CE device based on a current user context, wherein the current user context is similar to one of the different user contexts; and providing a recommendation comprising the predicted device setting to the CE device.

18. The computer program product of claim 17, wherein the CE device comprises a display screen, and the predicted device setting comprises a predicted picture setting.

19. The computer program product of claim 18, wherein picture quality of the display screen is adjusted in accordance with the predicted picture setting.

20. The computer program product of claim 17, wherein the method further comprises:

receiving user feedback indicative of user satisfaction with the recommendation; and updating the one or more machine learning models based on the user feedback.

21. A method comprising:

receiving device setting behavioral data collected from different consumer electronic (CE) devices, wherein the device setting behavioral data is indicative of different user-initiated adjustments to one or more device settings of the different CE devices, and the device setting behavioral data is further indicative of one or more device properties of the different CE devices and different user contexts in which the different user-initiated adjustments occurred;

generating one or more machine learning models based on a portion of the device setting behavioral data;

clustering, via the one or more machine learning models, at least one user associated with the different user-initiated adjustments into at least one user group; and for each user group, determining one or more user-preferred device settings that the user group prefers most, wherein, based on a current user context, the one or more user-preferred device settings are provided to a CE device as one or more new device settings available for user selection, and the current user context is similar to one of the different user contexts.

22. The method of claim 21, wherein the CE device comprises a display screen, and the one or more user-preferred device settings comprise one or more user-preferred picture settings representing a user-preferred picture mode choice.

23. The method of claim 22, wherein a collection of available pre-existing picture mode choices for the CE device is updated to include the user-preferred picture mode choice.

24. The method of claim 21, wherein, for each of the different user-initiated adjustments, the device setting behavioral data is further indicative of a user identifier corresponding to a user that the user-initiated adjustment is associated with.

25. The method of claim 24, further comprising:

pre-processing the device behavioral data by filtering out the portion of the device behavioral data based on pre-determined filtering criteria;

for each user with a user identifier included in the portion of the device behavioral data, generating a corresponding user feature vector based on the portion of the device behavioral data, wherein the corresponding user feature vector represents one or more historical user preferences of the user with respect to device setting;

normalizing each user feature vector; and generating a user feature matrix comprising each normalized user feature vector, wherein the one or more machine learning models are generated based on the user feature matrix.

26. The method of claim 25, wherein the pre-determined filtering criteria comprises at least one of a target user group or a device setting.

27. The method of claim 21, wherein the one or more machine learning models apply K-means clustering.

* * * * *